US008140187B2

(12) United States Patent
Campbell et al.

(10) Patent No.: US 8,140,187 B2
(45) Date of Patent: Mar. 20, 2012

(54) MULTIPLE DRAWER AND COMPARTMENT VENDING

(75) Inventors: David M. Campbell, Winchester, VA (US); Marcus A. Loignon, Winchester, VA (US); Michael V. Smith, Kearneysville, WV (US); Yaron Bukchin, Haney-Tikva (IL)

(73) Assignee: Automated Merchandising Systems, Inc., Kearneysville, WV (US)

(*) Notice: Subject to any disclaimer, the term of this patent is extended or adjusted under 35 U.S.C. 154(b) by 756 days.

(21) Appl. No.: 12/289,270

(22) Filed: Oct. 23, 2008

(65) Prior Publication Data

US 2010/0106291 A1 Apr. 29, 2010

(51) Int. Cl.
*G06F 17/00* (2006.01)

(52) U.S. Cl. ........ 700/242; 221/151; 221/152; 700/236; 700/243

(58) Field of Classification Search .................. 700/231, 700/232, 242, 243; 221/103, 104, 151, 152, 221/154; 312/215, 222
See application file for complete search history.

(56) References Cited

U.S. PATENT DOCUMENTS

| | | | | |
|---|---|---|---|---|
| 3,954,315 | A | 5/1976 | Sanden | |
| 5,014,875 | A * | 5/1991 | McLaughlin et al. | 221/2 |
| 5,346,297 | A * | 9/1994 | Colson et al. | 312/215 |
| 5,927,540 | A * | 7/1999 | Godlewski | 221/2 |
| 6,029,851 | A * | 2/2000 | Jenkins et al. | 221/102 |
| 6,065,819 | A * | 5/2000 | Holmes et al. | 312/215 |
| 6,073,834 | A * | 6/2000 | Michael et al. | 232/43.1 |
| 6,109,774 | A * | 8/2000 | Holmes et al. | 700/231 |
| 6,682,156 | B2 * | 1/2004 | Herrington | 312/215 |
| 6,996,455 | B2 * | 2/2006 | Eggenberger et al. | 700/231 |
| 2007/0244598 | A1 * | 10/2007 | Shoenfeld | 700/236 |

OTHER PUBLICATIONS

International Preliminary Report on Patentability in PCT Appln. No. PCT/US2009/005754, dated Apr. 26, 2011.
Pamphlet from Dec. 4-5, 2006 Israeli Purchasing and Logistics Managers Association (with English translation).
Photograph of Dec. 4-5, 2006 exhibit at the Israeli Purchasing and Logistics Managers Association.
Search Report and Written Opinion mailed Jan. 8, 2010 in WIPO Appln. No. PCT/US2009/005754.

* cited by examiner

*Primary Examiner* — Timothy Waggoner
(74) *Attorney, Agent, or Firm* — Davidson, Berquist, Jackson & Gowdey, LLP

(57) ABSTRACT

A multi-drawer and doored vending system in which each drawer has one or a plurality of compartments each holding an items to be vended, and each doored compartment contains at least one item for vending. Drawer control is provided by a drawer opening and position control system comprising an array of spaced apart control tabs on each drawer, a drawer lock and release assembly, and a progressively movable drawer position control bar to control drawer opening in conjunction with the control tabs. Each doored compartment also employs a lock and release assembly. A control system is provided to control user interface, to maintain product inventory counts and to control the vending process. This involves verifying the identity of a user seeking to obtain a vended item, verifying any other system or pre-vend requirements, and permits limited access to a drawer and compartment corresponding to an approved vend selection. An item return compartment is also included.

36 Claims, 19 Drawing Sheets

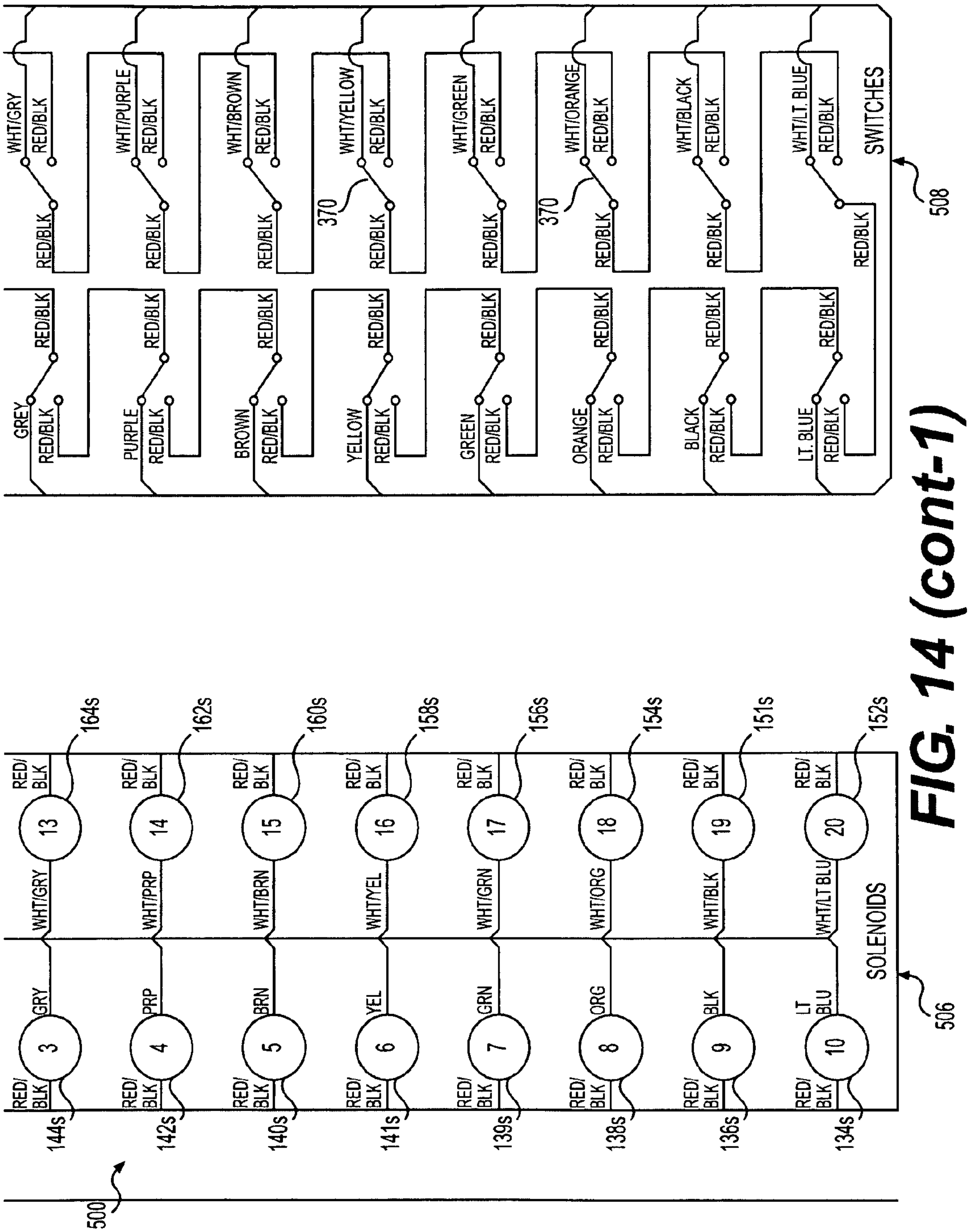
FIG. 14 (cont-1)

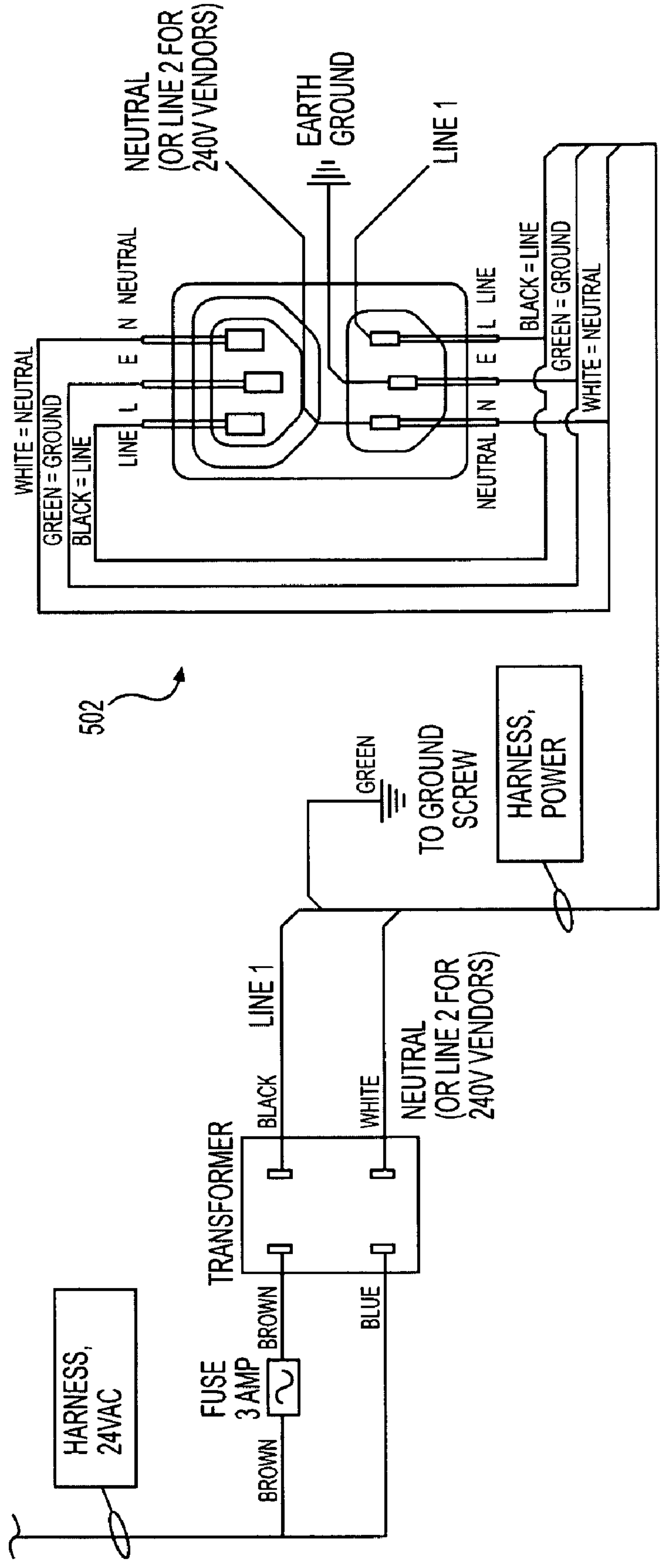
FIG. 14 (cont-2)

MULTIPLE DRAWER AND COMPARTMENT VENDING

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

FIELD OF THE DISCLOSURE

This disclosure relates to vending equipment having multiple drawers, multiple compartments, multiple compartments in drawers, multiple doored vending areas, and coupled vending areas, that can vary in height and the depth of internal compartments or sections so that a variety of items, that may also vary in size, can be conveniently vended. The equipment further permits those same vended items to be returned to the very same piece of vending equipment. In addition, each successive opening sequence is accomplished in a simple yet secure manner so that for any particular drawer the control system will only permit a given selected drawer to open to the next in-line drawer compartment that contains the next available item to be vended in that drawer, in a locker, in a cabinet provided with a combination of drawers and lockers or all lockers, each of which will have access thereto controlled using the same control system.

INTRODUCTION

Glossary: As used throughout this document:

The phrase "drawer" shall mean any sized drawer, including drawers having a single unit of height as well as multiples thereof.

The term "locker" shall include any size, non-drawer compartment that can have a variety of sizes, heights, widths and depths, depending upon the cabinet, and each will be provided with a lockable, access door.

DESCRIPTION OF PRESENTLY PREFERRED EXAMPLES OF THE INVENTION

Brief Description of Figures

The invention is better understood by reading the following detailed description with reference to the accompanying drawings in which.

DESCRIPTION

The vending equipment disclosed herein is for vending a wide variety of items including tools, various manufacturing supplies, safety equipment, medications, medical supplies, school supplies or any item where it is desirable or essential to monitor, control and identify what item is being, by whom an item is taken, and to only permit authorized access to the drawer vend equipment. The vending equipment also permits previously vended supplies to be returned to the vending equipment, allows for the orderly refilling of empty drawers, and to receive the returned items in a controlled manner.

Multiple drawer vending equipment is known and includes equipment such as is shown in U.S. Pat. Nos. 5,205,436; 5,940,306; and 6,109,774, for example. These approaches represent complicated drawer opening arrangements, rotating systems, pulley controls and screw type controls over drawer opening and closing.

The equipment herein disclosed provides a secure and monitorable vending system yet one which encompasses a far more direct approach for controlling what drawer is open and to what degree. The present equipment also assures that only an authorized individual is obtaining authorized items for an authorized purpose. Further, each drawer can be used as a single or base height drawer or drawers in multiples thereof. Each drawer is slidably retained in a cabinet in a manner that permits full control over all drawers and permits drawers of different heights to be used in the cabinet, at the discretion of the cabinet owner and without any alteration of cabinet hardware or controls.

Figure 1:
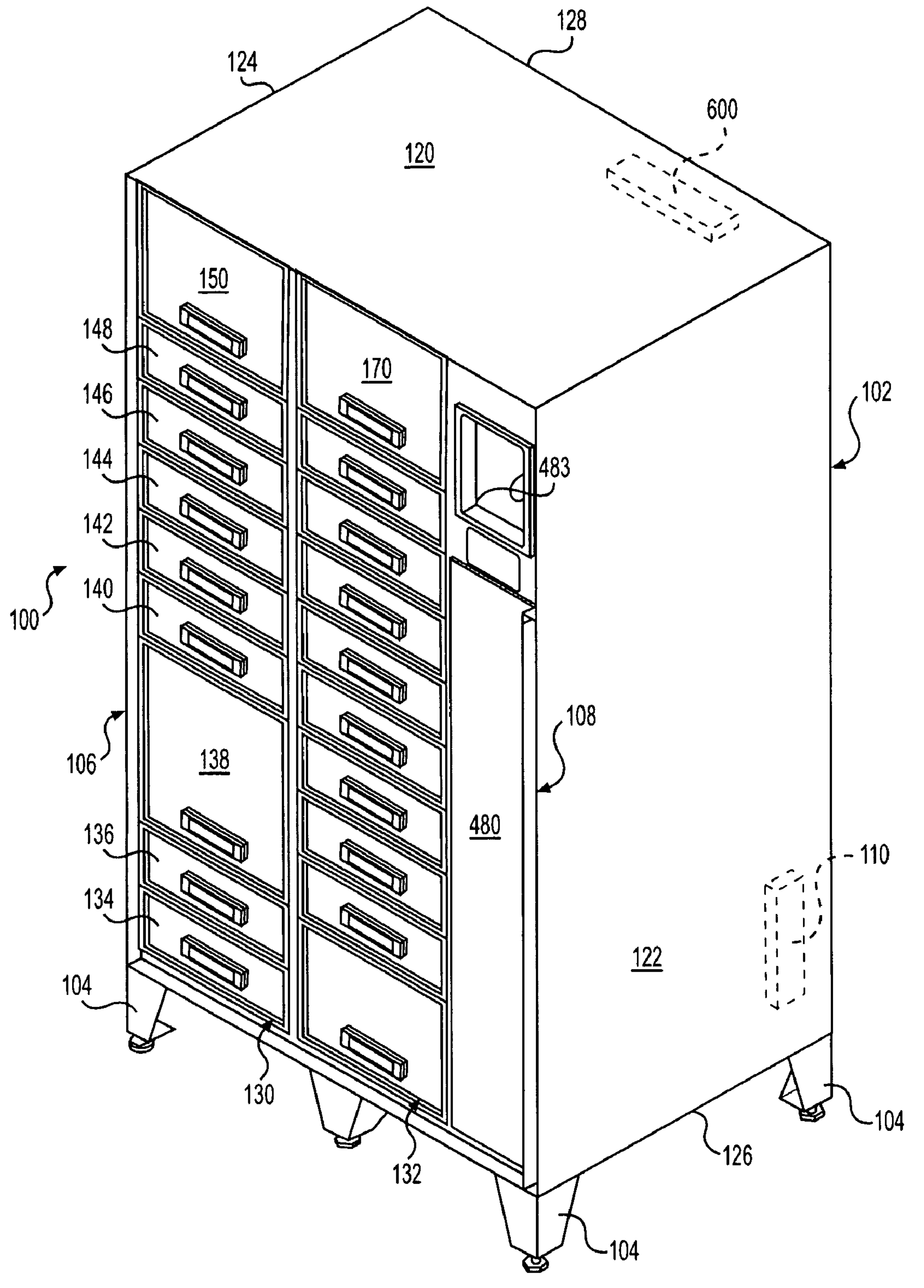
FIG. 1 is a perspective exterior view of the drawer vending equipment disclosed herein.

FIG. 1 shows a drawer vending device 100 comprised of an outer cabinet 102, a plurality of support legs 104, a drawer section 106, a return section 108 and an internal controller system 600. The vending device 100 could also include a suitable chiller 110 to cool the interior of the vending equipment in those cases where the items being vended were temperature sensitive.

Outer cabinet 102 includes a top wall 120, side walls 122 and 124, a bottom wall 126 and a rear wall 128. These exterior walls are suitably connected together to form the enclosed cabinet 102, for example, by rivets, bolts, welding or other conventional techniques or combinations thereof and may further include an internal frame (not shown). These walls can be constructed from sheet metal, plastic composite structures, molded structures or combinations thereof. The legs 104 can be connected to bottom wall 126, or to another structural unit of cabinet 102, and the number of legs used is dependent upon the size and weight of the vending device 100 and its contents. Six legs 104, for example, are shown with three being located along and spaced apart on the front and rear edges of bottom wall 126. It should be understood that legs 104 can be located at other positions and these locations shown herein are merely exemplary.

Figure 2:
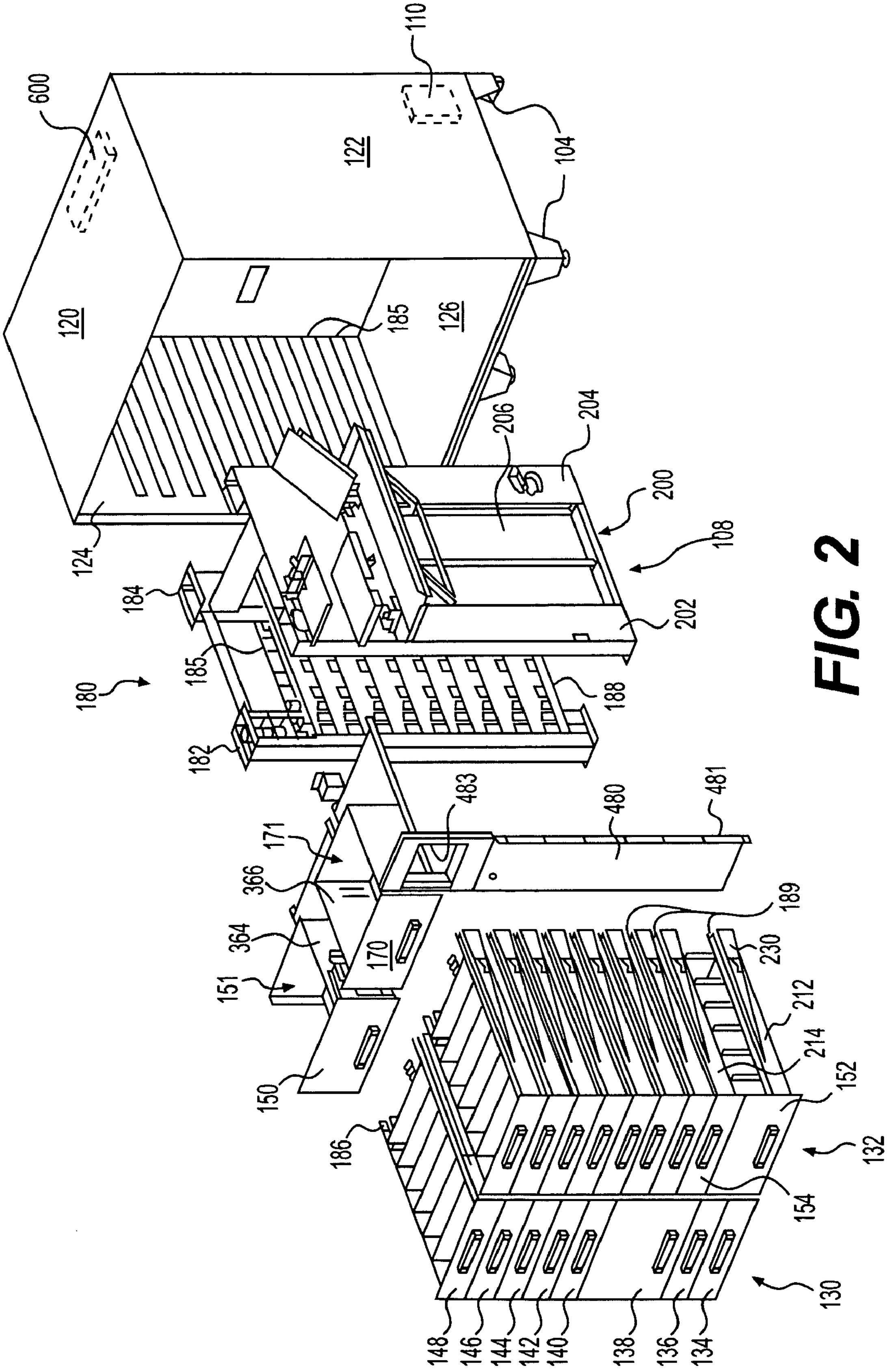
FIG. 2 is an exploded version of the equipment shown in FIG. 1.
Figure 3:
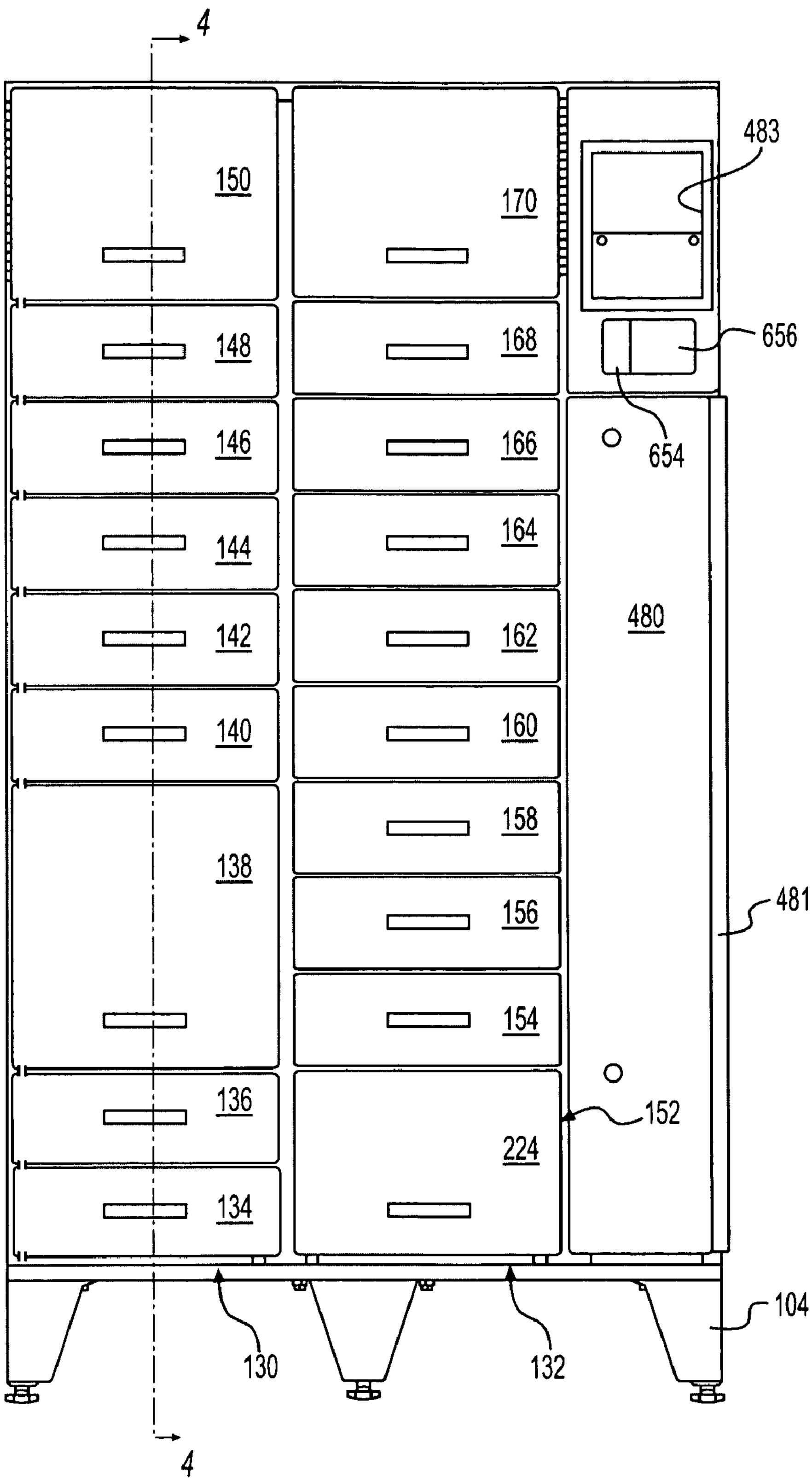
FIG. 3 is a front elevational view of the equipment shown in FIG. 1

Drawer section 106 is shown in FIGS. 1-3 as having two or more vertically stacked and adjacent drawer units 130 and 132. It should be understood that this is also exemplary as more or less drawer units can be used and controlled in the same fashion as is described hereinafter drawer units 130 and 132.

The left most vertical stack 130 is shown as being comprised of two lower drawers 134 and 136 each having a first or base height as shown. The next drawer there above 138 has a height equal to three times that of the first or base height, to thereby accommodate larger items. Thereafter, continuing up drawer unit 130, there are five additional drawers, 140-148, each of which comprise drawers having the base height. The top most part of the vertical stack 130 comprises a door 150 leading to an interior compartment 151 which has a height, for example, equal to two times the height of a base height and can house larger items that might not fit well within a drawer. Consequently, drawer unit 130 has the capacity of ten drawers each of which can have the base height, but any number of drawer heights can be configured within the limits of that drawer system, and any number of upper doored enclosures. It should be understood that a vertical stack of ten drawer slots is exemplary and that other configurations are included herein.

The adjacent vertical stack 132 begins with a bottom drawer 152 having a height equal to two of the first height drawers, and then there are eight first or base height drawers, 152-168. Again, this comprises a stack equal to ten base height drawers or as many as fit in the supplied cabinet. At the top of stack 132 is another door 170 behind which is compartment 171 having a height equal to the height of compartment 151. It should be further understood that other compartment configurations could also be used.

Thus, in each of the vertical stacked drawer sections 130 and 132 as shown there is room for ten (10) first height drawers, with the actual specific configuration depending upon the needs of any particular user of the equipment, and a top doored compartment. While several different drawer heights have been shown in the above exemplary configuration, specifically different drawer fronts, it should be understood that a drawer could have other multiples of the base drawer height so that a drawer could, for example, have a height equal to multiples of four or five or other multiples as well depending upon the desires for user and the item or items to be vended.

Figure 4:
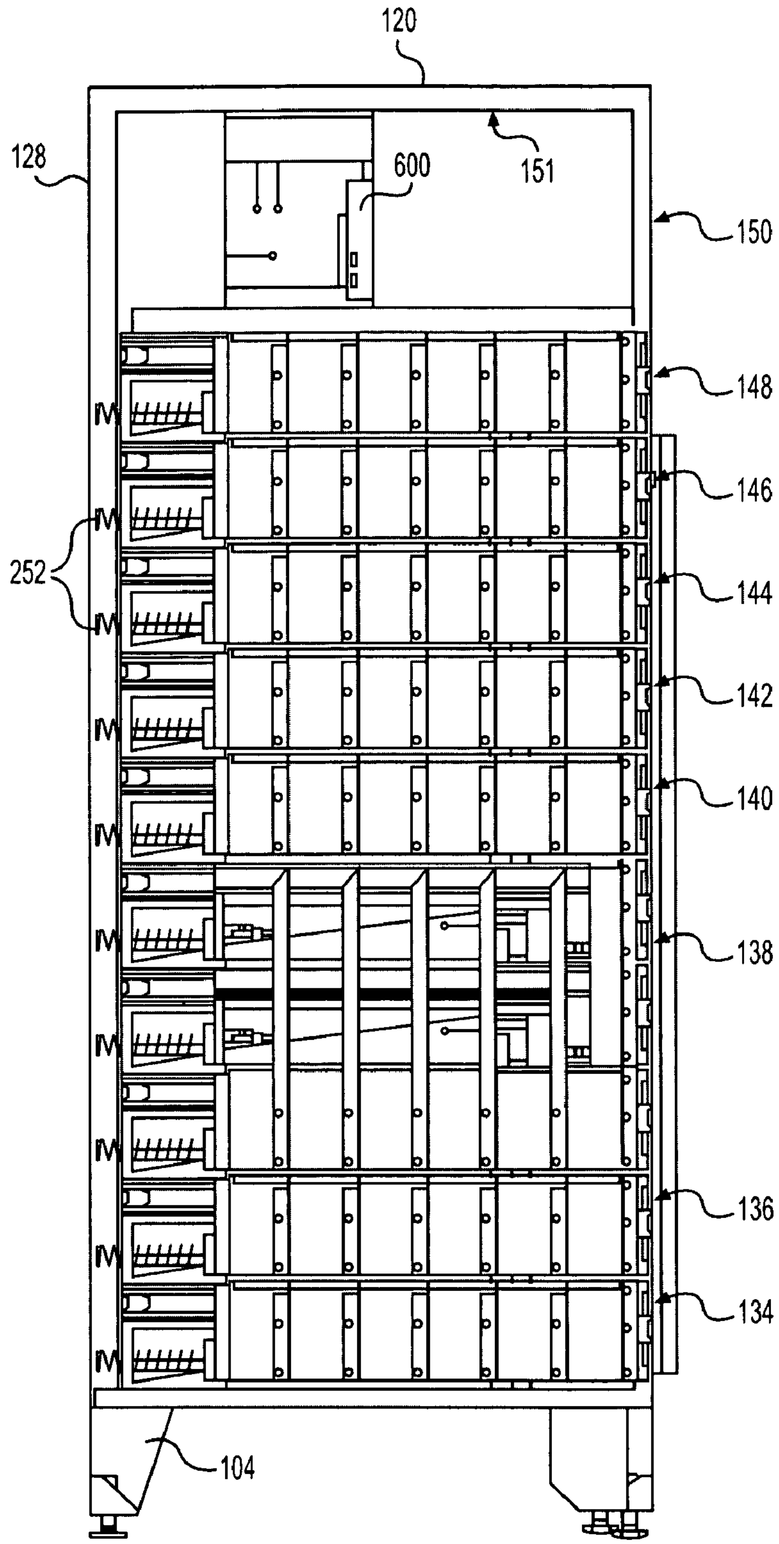
FIG. 4 is a cross sectional view taken along line 4-4 in FIG. 3.

FIG. 4 is a cross sectional view along line 4-4 in FIG. 3 and shows the various drawer heights from the side.

FIG. 2 shows the same two vertical stacks of drawers 130 and 132 as well as the sliding supports therefore. For example, there is a center support structure 180 comprised of a front vertical support 182, a rear vertical support 184 and interconnecting support structures in the form of drawer slides, and a top frame 187.

Figure 5:
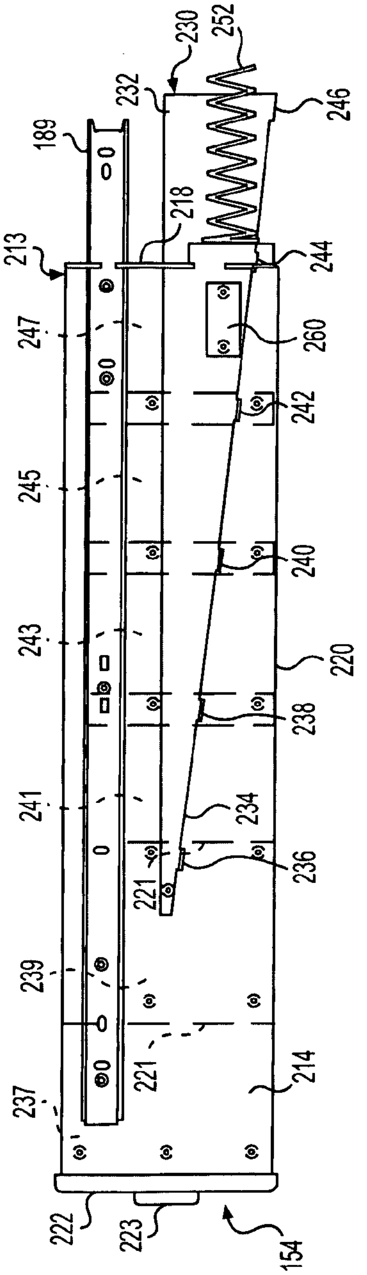
FIG. 5 is a side elevational view of a base height drawer.
Figure 6:
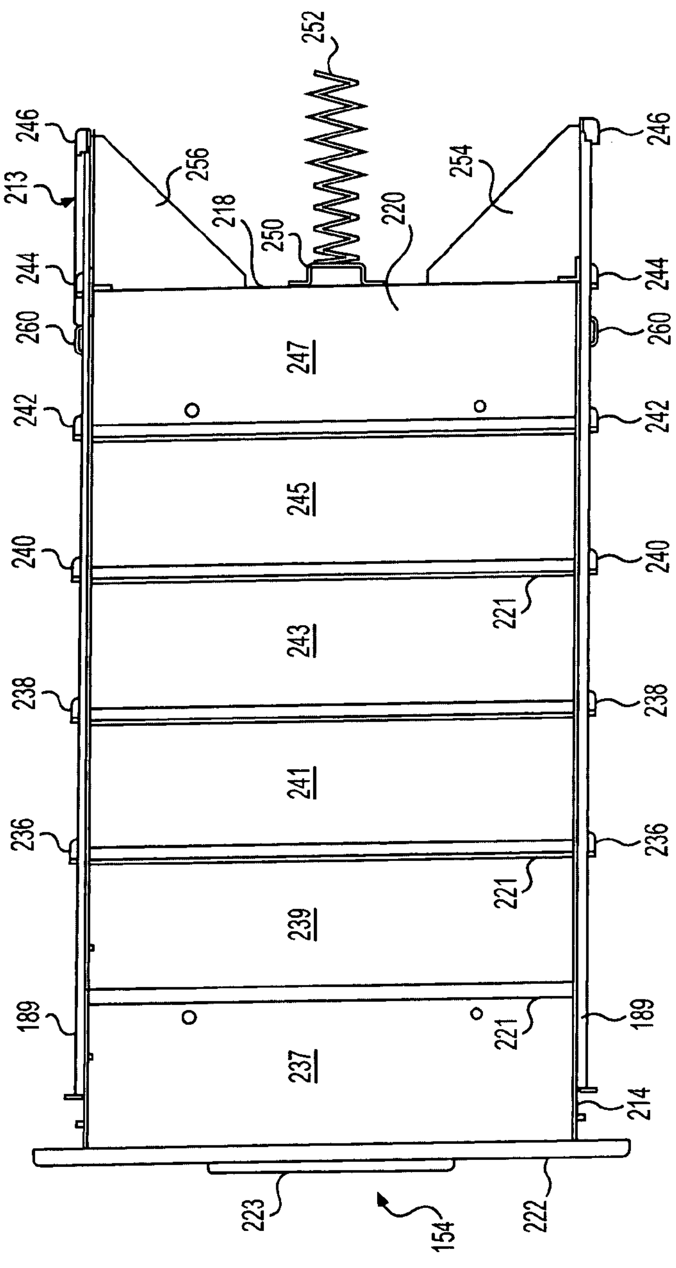
FIG. 6 is a top plan view of the drawer shown in FIG. 5.
Figure 7:
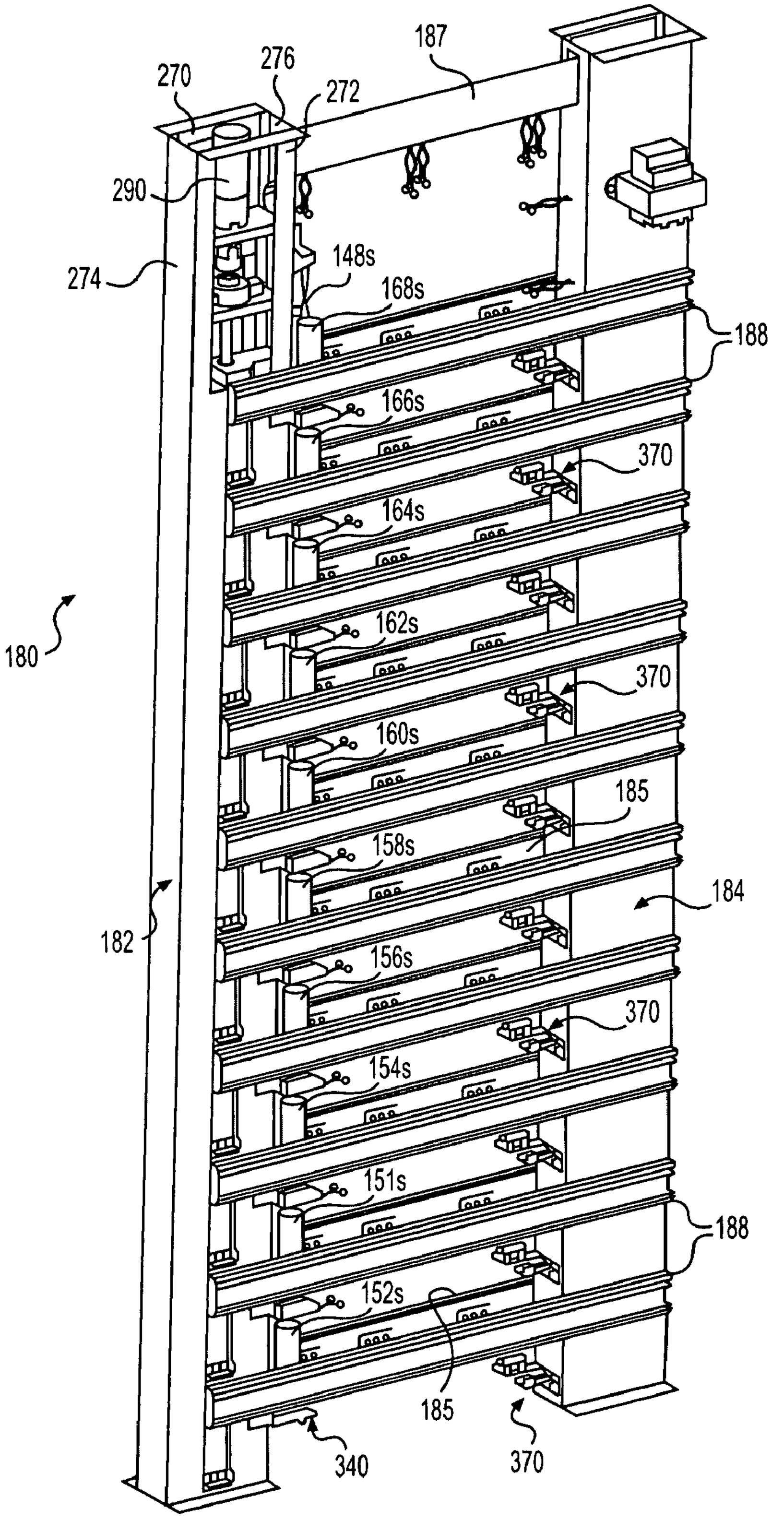
FIG. 7 is a side perspective view of an internal wall within the vending machine that includes the drawer position control system.
Figure 12:
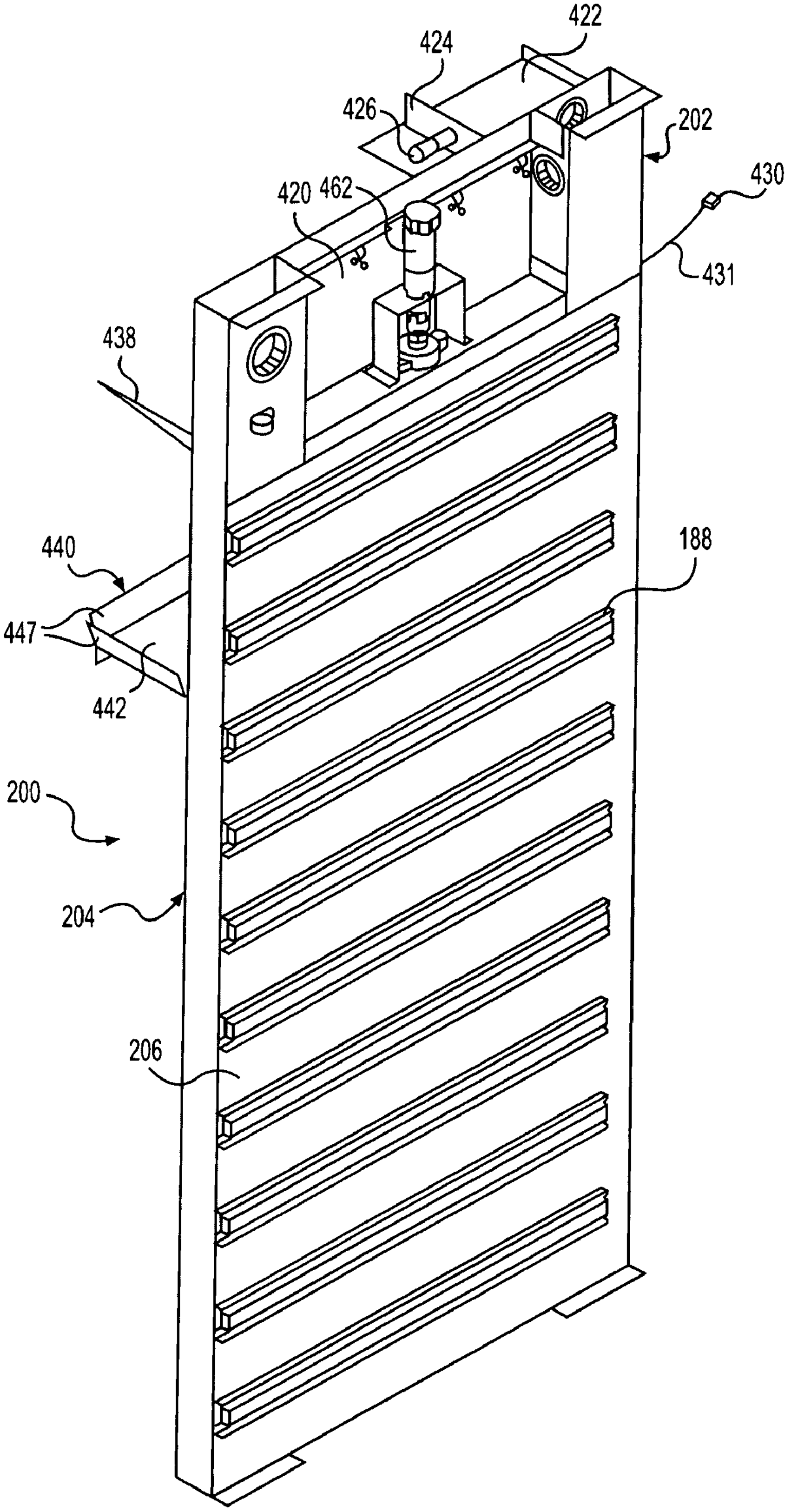
FIG. 12 is a perspective view of the opposite side of the structure shown in FIG. 11.

The left vertical stack of drawers 130 includes pairs of slide supports 186 that cooperate with opposing pairs of slide supports 185 in cabinet 102 with one portion of slide supports 185 being shown in FIG. 2. Specifically, the interior of side wall 124 is shown and includes a plurality of spaced apart drawer slide supports 185. As noted above, the center support 180 also includes a plurality of complementary spaced apart slide supports with supports 185 being on the left side and 188 being on the right side thereof as shown in FIGS. 2, 7 and 12. The right side vertical stack of drawers 132 includes pairs of slide supports 189 on each drawer, for example as shown in FIGS. 2, 5 and 6, and these pairs of slide supports 189 cooperate with slide supports 188.

The location of the sets of slide supports 185 and 188 will be at uniform, spaced apart positions within cabinet 102 so as to be aligned with the cooperating pairs 186 and 189 mounted to the side walls of each of the drawers in the two vertical stacks 130 and 132 respectively. As a result, each drawer will be able to fit into the cabinet in a uniform manner and will be equally spaced from one another and slide in and out of the cabinet.

Figure 11:
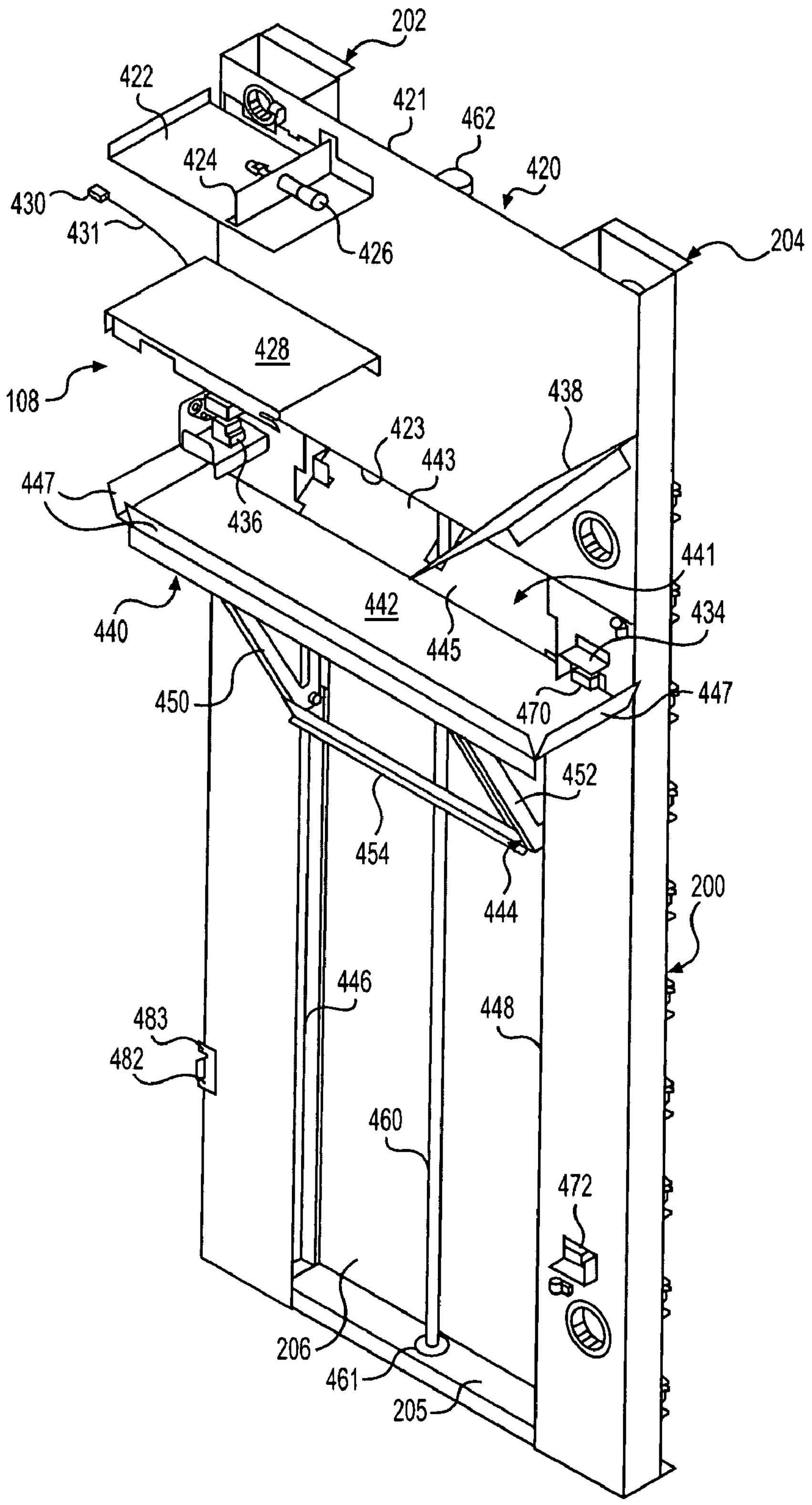
FIG. 11 is a side perspective of a portion of the return space including a return system elevator.

The right side portion of the opposing pair of slide supports 188 are located on an interior side of interconnecting wall 206 as shown in FIG. 12 of wall unit 200 that forms the right side of that portion of cabinet 102 housing the two vertical stacks of drawers 130 and 132. Wall unit 200 also forms the left side of the return section 108. As shown in FIGS. 2, 11 and 12, wall unit 200 includes a front vertical support member 202, a rear vertical support member 204 and the interconnecting wall 206.

FIG. 2 also shows the right side of vertical stack 132 of drawers 152-170, and shows as well the complementary slide support 189 mounted, for example, on a side wall 212 of drawer 152. The next above drawer 154, which has a height equal to the first or base height, also includes a slide support 189 mounted on its side wall 214. It can be noted while drawers 152 and 154 each have different front heights, they each can include similar side walls 212 and 214, respectively, which are preferably, but need not be, of the same in height, length and configuration. In fact, the same side wall forms a part of each drawer regardless of the size of the drawer cover and the height of the drawer in terms of what it can hold. It should be understood that the drawer side walls 212 and 214 could be higher, to accommodate tall or large items, and even extend into the next upper drawer slot or section, relative to the area of the slide supports, but without any slide supports 189 being present. Likewise, such an upwardly extended portion of the side wall would not need the control tab panel 230 either. Also, as will be discussed later herein, the control system 600 will know that the drawer control assemblies in each vacant drawer slot will be inactive and if such a drawer location were to be selected the control system will automatically request that another selection be made.

FIGS. 5 and 6 show a representative drawer 154 in greater detail, and much of this construction is repeatable in each drawer. Drawer 154 is comprised of a compartment section 213 and a front face 222. The compartment section 213 includes the right side wall 214, the left side wall 216, a rear wall 218 and a bottom wall 220. The front face of drawer 154 is comprised of a wall 222 that includes an optional handle and/or drawer label location 223. This front face 222 of drawer 154 has a vertical dimension that represents a base height drawer front face structure and as shown in FIGS. 5 and 6 extends laterally beyond side walls 214 and 216. That lateral extension serves to cover the center support 180 and a portion of the front of wall section 200. How the compartment section 213 is configures depends upon the vendor and what items are to be vended. The base or standard compartment section 213 will not have any internal partitions. Drawer 154 as shown here has six interior compartments 237, 239, 241, 243, 245 and 247 that are defined by five removable interior walls 221 that span laterally between and are connected to side walls 214/216.

As can be seen from FIG. 2, the front faces of drawers 152 and 154 are different in height. While drawer 154 has a first or base height front face, as discussed above, drawer 152 has a front face height equal to two of the first of base front face heights, so that the front face 224 of drawer 152 will be a multiple of two times base size drawer front face. The compartment section 213 of drawer 152 will, however, begin with the same standard compartment section as was used on drawer 154 and then be internally configured as desired. Consequently, while the front face of drawer 152 is twice the height of the base height, the drawer fits perfectly within cabinet 102 and the front face 224 interfits with the other front faces.

What is common in each drawer, regardless of the overall height of the front portion or face of a drawer, is that the compartment section 213 are each the same and comprise a first or base height that defines the location of the drawer slide supports in cabinet 102. By having each drawer compartment section to be sized and configured in the same way allows a variety of drawer front face sizes to be easily accommodated and changed to meet varying demands of vendors and the changing nature of the items being vended. Along this same line, each set of opposing slide supports 188 will be positioned at corresponding spaced apart locations within cabinet 102. Thus, ten drawers each having the base height can be used or combinations or multiples of that base height can be similarly contained. Each drawer, regardless of the size or height of its front structure will interfit with the slide supports in cabinet 102 and with each of the other drawers being used. Thus, in each case, there will be a base side wall, to which slide supports will be mounted and they will interfit with the corresponding slide supports in cabinet 102. Thus, each drawer will fit into cabinet 102 and work in conjunction with a corresponding set of slide supports in cabinet 102 and each will fit within and operate in a coordinated manner with adjacent drawers.

Looking again at FIGS. 5 and 6, each drawer will include on each side the slide supports, such as those shown in FIG. 5 at 189, and a drawer control tab panel 230. Control tab panel 230 has a straight top edge 223 and an angled bottom edge 234 on which are formed a plurality of control tabs 236, 238, 240, 242, 244 and 246 that will coordinate drawer opening to interior compartments 237, 239, 241, 243, 245 and 247 respectively. The back of rear wall 218 supports a spring holder 250 and a spring 252 as well as opposing support plates 254 and 256 that interconnect with a rearwardly extension of the control tab panel 230 to provide extra support for the rear portion thereof. In addition, each control tab plate 230 also includes a side mounted limit switch actuator 260 that can be mounted to control tab panel 230 by screws, rivets, welding or another connection approach. Control tabs 236-246 are spaced apart both horizontally but also vertically along the angled bottom edge 234. In FIGS. 5 and 6 there are six control tabs, but it should be understood that there will be as many control tabs as there are compartments. Thus, control tabs 236-246 are located in a progressive yet regulated sequence that will allow the control system and the drawer position control system to keep drawers locked, allow drawers to be released for opening and also control access to only one compartment containing the next available item that has been selected for vending.

Control tabs 236-246 are preferably formed as bent tabs and that they be integral with control tab panel 230. For example, panel 230 can be stamped from metal and tabs 236-246 than bent into position along bottom edge 234. However, this is only an example of one approach at forming panel 230.

Once formed, a control tab panel 230 will be fixed to each side of each drawer by screws, rivets, welding or other connection technique. As will become clear in the following discussion of the drawer position control system, the positioning of control tab panels 230 on the drawers is important as locking of the drawers employs the first of the control tabs 236 in conjunction with a first part of the drawer control assembly, with that same tab 236 and the remaining control tabs then being used in conjunction with a second part of the drawer control assembly to provide positive control over drawer opening thus assuring each drawer will only be openable to the next available compartment containing an item for vending.

Figure 8:
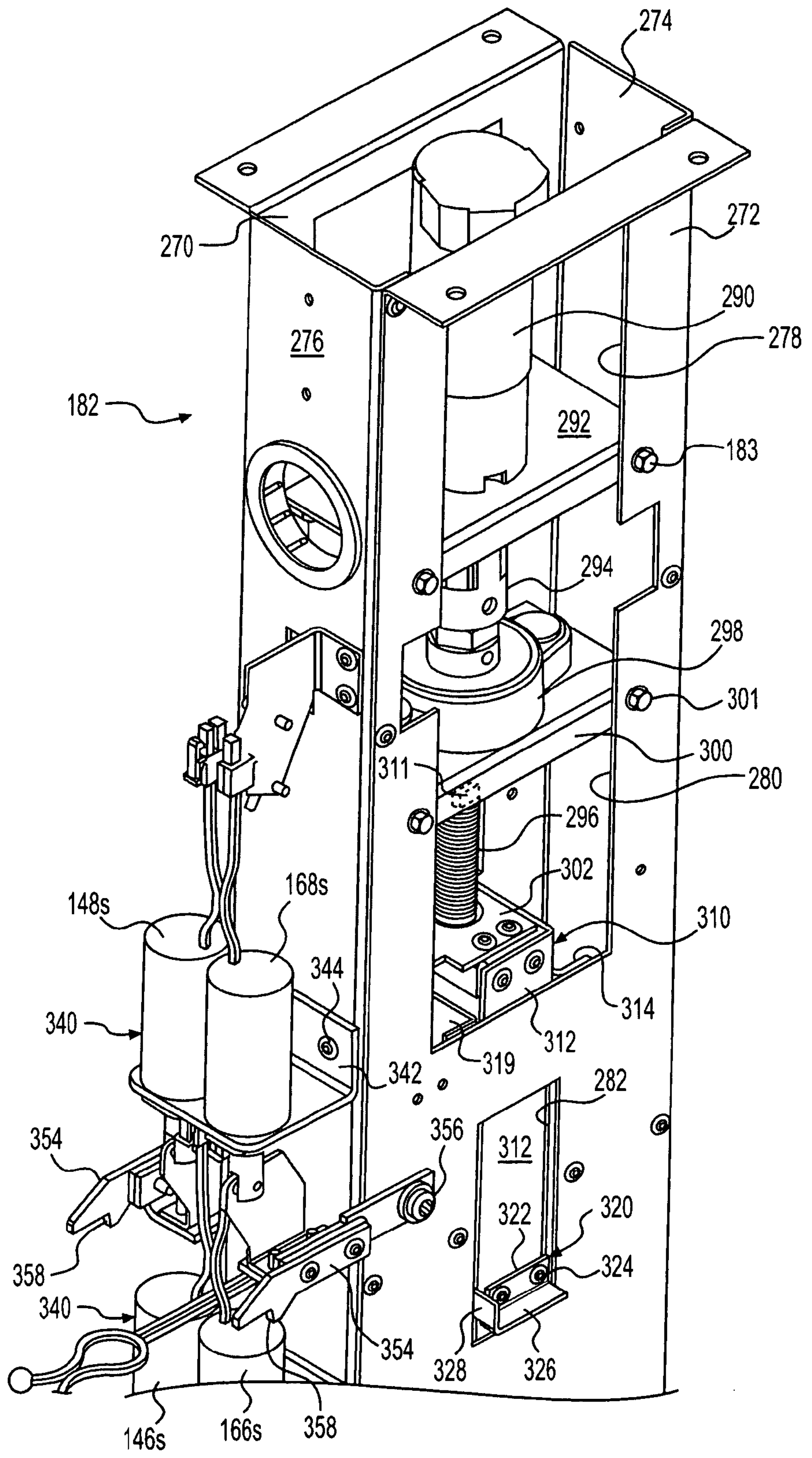
FIG. 8 is an enlarged view of the portion within the circle shown in FIG. 7.

The center support 180 is best shown in FIGS. 7 and 8 with FIG. 8 being an enlarged portion of the top left corner of FIG. 7. As noted previously, front support post 182 and rear support post 184 comprise two of the main internal support structures and they provide the main vertical support for the center of the two stacked sets of drawers. A plurality of vertically spaced apart slide supports 185 and 188 positioned on opposite sides of center support 180 and each provides further structural support for that internal structure. A cross beam 187 is also provided at the upper ends of posts 182/184, to which it can be connected, for example, by screws, rivets or spot welding, to provide an additional structural connection between those front and rear support posts in addition to that provided by the slide supports 185 and 188 that are each secured between posts 182/184 by screws, rivets or other connection technique. Collectively, slide supports, beam 187 and posts 182/184 comprise a rigid structure.

FIG. 7 also shows the first part of the drawer control assembly in the form of a stacked plurality of drawer lock and release assemblies 340 and from this view shows solenoids 152S-168S. The stop tab assemblies 320 are also shown on the side of support post 182 along with the drawer position control bar lift motor 290 and the rearwardly mounted limit switches 370 associated with each drawer.

As shown in FIG. 8, front support 182 post is rectangular in cross-section, has a hollow interior, and is comprised of two opposing side pieces 270 and 272, that are secured to opposing front and rear walls 274 and 276, respectively by screws, rivets, welding or another connection technique. Each of the side walls 270 and 272 include an upper opening 278 and 280, respectively, and a series of uniformly spaced apart vertically extending openings or slots 282 that extend for a short distance down the length of each side wall 270 and 272.

Included within the front support 182 is the second part of the drawer control assembly in the form of a drawer position control bar lift motor 290 that is mounted to a support plate 292 that is itself fixed within the front support post, 182 by screws 183 or other convenient connection technique. Motor 290 could operate a device such as a drive shaft connected via a spider coupling 294 to a threaded rod 296 mounted within a bearing 298 that is supported by a mounting plate 300 that is connected to side walls 270 and 272 by screws 301 or by any suitable connection mechanism. Threaded rod 296 passes through a horizontal plate 302 mounted to the top of drawer position control bar 310. Mounted to the bottom side of plate 302 is a captive nut (not shown) and threaded rod 296 is threadedly engaged with that captive nut in which it can turn in both clockwise and counter-clockwise directions and thereby move drawer position control bar 310 in both upward and downward directions depending upon whether the threaded rod 296 is rotated in a clockwise or counter clockwise direction respectively.

Drawer position control bar 310 is itself formed as a tubular column having a rectangular cross section with one side wall being shown, for example, at 312 in FIG. 8. Drawer position control bar 310 is mounted so that it can move vertically within support post 182 and is positioned by means of supports, one of which is shown at 314 in FIG. 8, and two such supports will be positioned opposite one another within the hollow interior of support post 182 and a plurality of pairs will be located at spaced apart intervals up and down the interior of support 182 to allow drawer position control bar 310 to traverse in a vertical direction and remain positioned there between.

Mounted to the drawer position control bar 310 are a series of spaced apart stop tab assemblies 320 each of which has a vertically extending mounting flange 322 connected to a side wall 312 of drawer position control bar 310, for example, by screws or rivets 324, or any other convenient method of connection. A horizontally extending flange 326 extends from the vertically extending flange 322, and flange 326 can be a bent portion of mounting flange 322 or a separate piece connected thereto, for example by welding. Horizontal flange 326 itself supports a vertically extending stop flange 328 that provides a controlled stop to the drawer opening, working in conjunction with the control tabs on the drawers depending upon the location of the drawer position control bar 310. Stop flange 328 can be, for example, an upwardly bent portion of flange 326 or alternatively it could be part of an opposing structure on the opposite of drawer position control bar 310 (not shown) the structure of which will be the reverse of what is shown in FIG. 8 for mounting flange 322 and horizontal flange 326, but on the opposite side of drawer position control bar 310. When stop flange 328 is part of a similar opposing tab structure there will be a like horizontal flange 326 which will be itself formed with a mounting flange 322 and be mounted to the opposite side wall 272 of drawer position control bar 310 by similar rivets 324. Thus, stop flange 328 can extend from one side of drawer position control bar 310 through support post 182 to the other side of drawer position control bar 310 and from one vertical slot 282, in side wall 270 to a like vertical slot 282 on the opposing side wall 272 of support post 182. As is shown in FIG. 7 there are a plurality of stop tab assemblies 320 at spaced apart intervals along the vertical length of support post 182, with one assembly being provided for each drawer that might be used in a vending machine.

As noted previously, threaded rod 296 operates in a captured nut mounted to plate 302 so that as motor 290 rotates threaded rod 296 in a clockwise manner drawer position control bar 310 will be raised within support post 182 and as drawer position control bar 310 moves each stop tab assembly 320 will be similarly moved upwardly within its respective slot 282. Conversely, as motor 290 is driven in a counter clockwise direction drawer position control bar 310 will be moved downwardly thereby moving each stop tab assembly 320 in a downward direction, again with in each respective slot 282.

Figure 9:
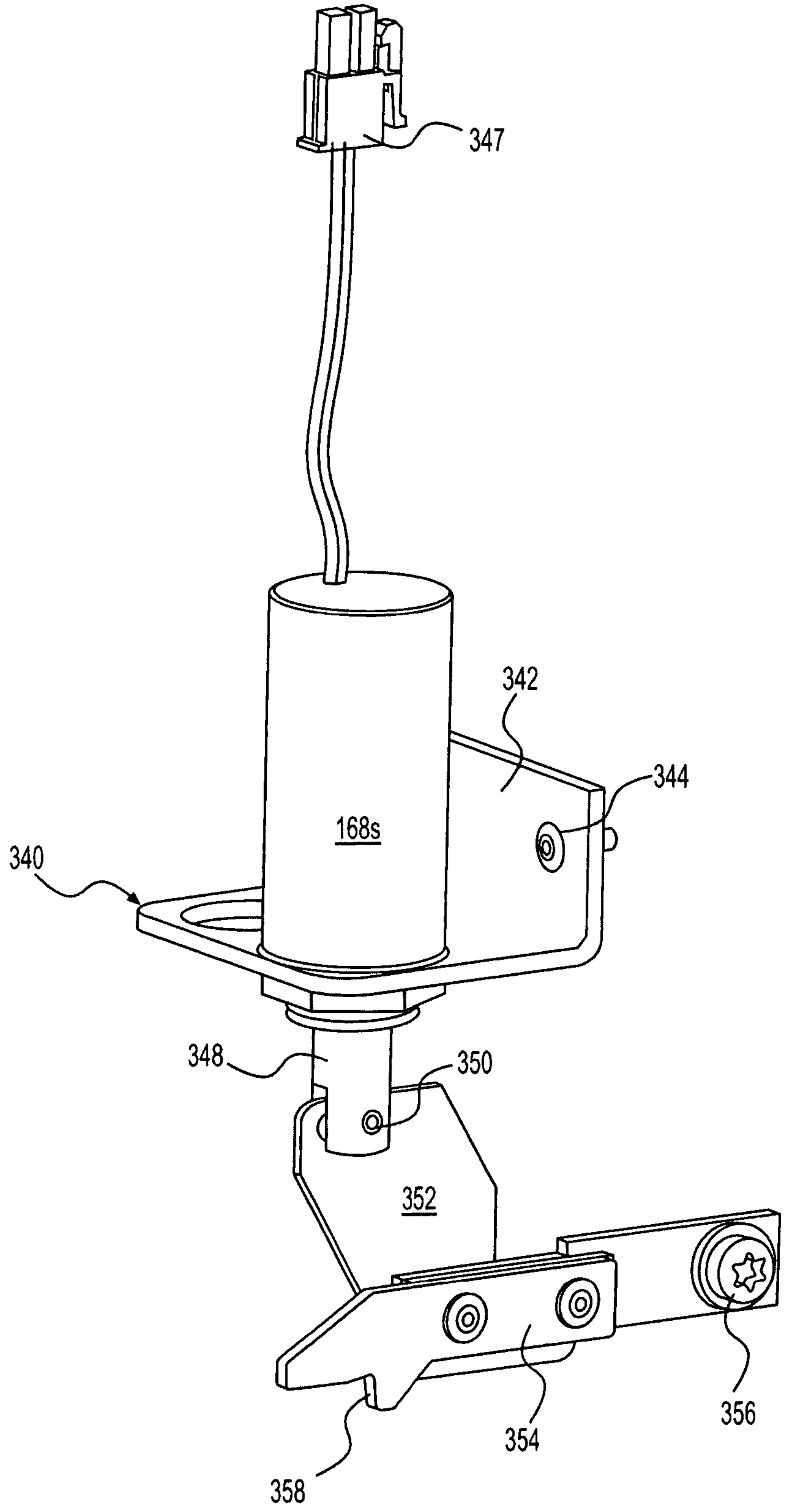
FIG. 9 is an enlarged view of a portion of the drawer locking and release assembly.
Figure 14:
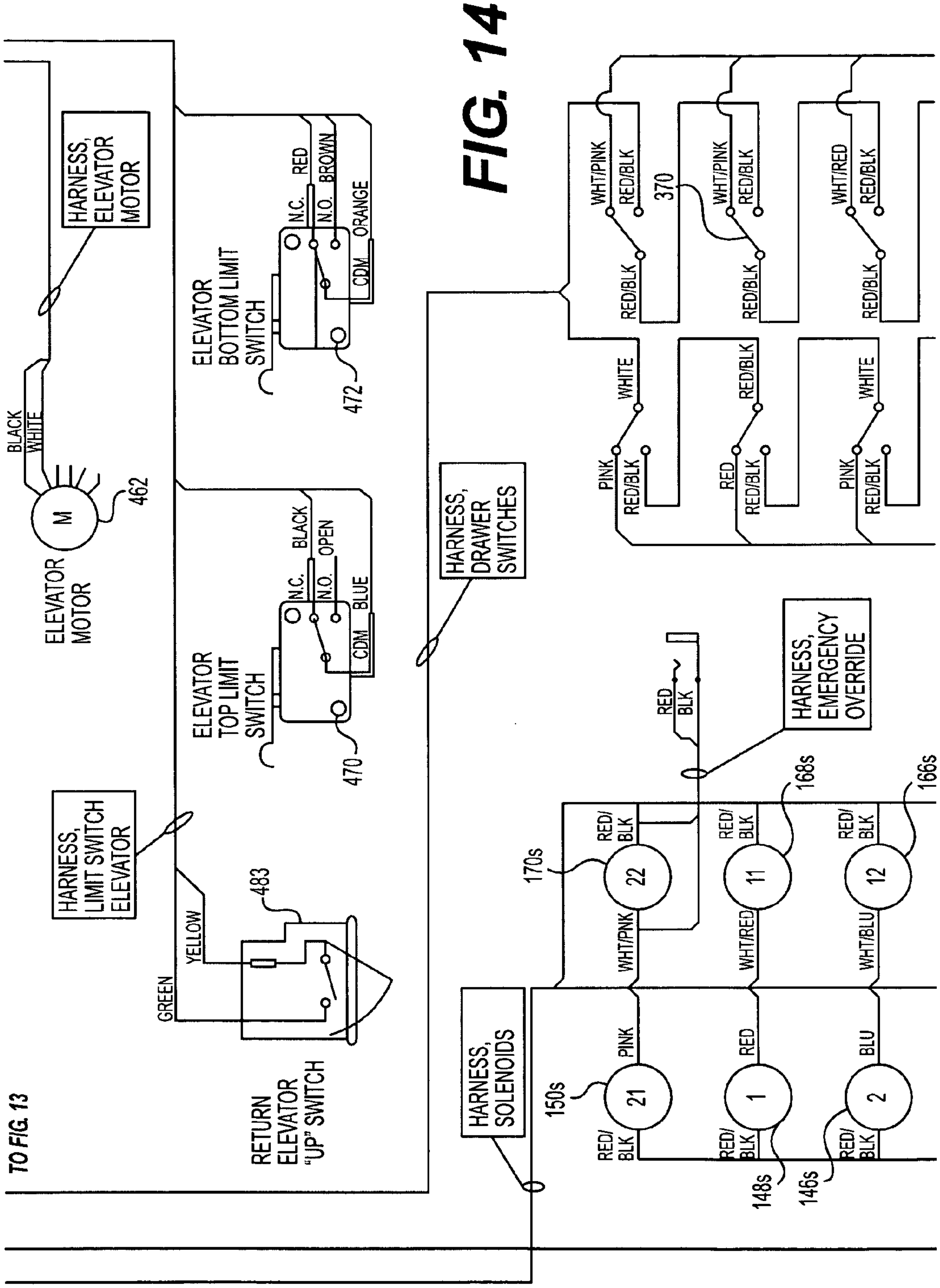

FIGS. 8 and 9 also show an exemplary drawer lock and release assembly 340 mounted on the rear face of support post 182. Each such drawer lock and release assembly 340 is comprised of a mounting bracket 342 riveted or otherwise attached to the rear wall 276 of support post 182, for example, by rivets 344, and a solenoid. Since this assembly 340 is at the top of support post 182, the right solenoid is for drawer 168 and the solenoid is referenced as 168S. The adjacent solenoid is for drawer 148 and is thus solenoid 148S. The next two solenoids directly there below are 166S and 146S, respectively. These solenoids are also shown in FIG. 14 within the array 506, and this use of solenoids should be understood ad being representative of one of several methods that could be used for locking and releasing drawers or lockers. Other approaches could include, magnetic catches, a pin acting in a hole, a rotating latch or other mechanical or electrical devices. An exemplary drawer lock and release assembly 340 is shown in greater detail in FIG. 9. The assembly includes a power and control connection plug 347 and solenoid 168S itself includes an operating shaft 348 that is pivotally connected by a pin 350 to a connector plate 352 that in turn is connected to a lever 354 that is, in turn, pivotally connected to side wall 270 of support post 182 by a screw 356 or other suitable pivot connection. Lever 354 is mounted in a rearward facing manner so that a rearward facing edge of depending tooth 358 can engage the first tab 236 of the control tab panel 230 adjacent the front end of a drawer with which it is paired. When a drawer is locked, tab 236 will be engaged by tooth 358 of the drawer lock and release assembly 340. When a specific drawer is selected and a vend is authorized, the control system 600 will activate the correct solenoid associated with the selected drawer, for example drawer 154 when solenoid 154S is activated that drawer will be released by its lever 354 being raised. This lifts tooth 358 out of engagement with control tab 236. When actuated, each solenoid will remain activated for a period thus keeping lever 354 and tooth 358 in raised condition thereby assuring that spring 252 will be able to push the selected drawer to a slightly open condition and to assure that control tab 236 will have moved past tooth 358. When a drawer is slightly opened in this manner then the user can easily pull the drawer open to the next accessible compartment. Spring 252 at the rear of each drawer is compressed enough to push the released drawer out enough so that control tab 236 will be moved past tooth 358 and so that the individual seeking a vended item will be able to pull the selected drawer to an open position. How far drawer 154, for example if that was the selected drawer, can be opened now depends upon the position of the stop tab assembly 320 and specifically where the stop flange 328 is located vertically relative to its slot 282 in support post 182 which will determine which control tab will be hit thereby stopping further drawer opening. When a drawer, a door or locker is opened or closed there will be a switch, such as limit switches 370, to provide data to the VMC controller corresponding to the present condition of the drawer, door or locker. When the switches are tripped in one way the data provided will indicate that the drawer, door or locker is in an opened condition and when tripped in an opposite way the control system will know those items have been closed, Control system 600 will be reconfigured when drawers are re-stocked and the system 600 uses a count-down approach. This means that VMC 604, which is in control of the firing or activation of each of the solenoids 506, will write when each solenoid is fired and write the last-opened drawer or door and compartment number to a location in the VMC's on-board, non-volatile memory. Thus, when a particular drawer and compartment, or a group of drawers and compartments are again selected, the control system 600 will base the next firing of solenoids on the known data corresponding to previous openings and the last written drawer and compartment numbers, and activate the solenoids for only that drawer and compartment, or for a selected group of drawers and the respective compartments therein, which contain the next available item or items for vending. This way the control system can keep track of which was the last compartment in each drawer from which an item was vended. Assuming first that all of the compartments in the drawer selected here, 154, were full then stop flange 328 will be positioned by motor 292 in its upper most position. Then, as drawer 154 is opened, by a user pulling on handle 223, the first control tab 236 will be intercepted by stop flange 328 which thereby provides as a controlled stop for further movement of drawer 154, and only the first compartment 237 will be made available for vending. If, on the other hand, drawer 154 had been opened previously twice, so that compartments 237 and 239 were both now empty, a fact that the control system monitors, motor 290 would be positioned by control system 600 at a point where stop flange 328 was positioned at a mid-level position and be in a location where it would engage control tab 240 thereby acting as a controlled stop and only permitting drawer 154 to open enough to make the contents of the third compartment 241 accessible to the user.

The first control tab 236 is positioned at a point spaced rearwardly from the front of drawer 154 as shown in FIG. 6. In this exemplary embodiment, while control tab 236 is shown as being located adjacent the first drawer partition 221 it is spaced a defined distance rearwardly from the front of the drawer or a common point in the cabinet so that each drawer can be locked at a common position. This same defined location of each locking assembly will apply to doored compartments as well. In view of the dimensions of support post 182 and the location of stop flange 328 when control tab 236 is engaged by stop flange 328 only the first compartment 237 will be accessible. Likewise, with control tab 246 at an extended position rearwardly of the rear wall 218, when tab 246 is engaged by the stop flange 328 the sixth or last compartment 247 will be accessible. In that situation, stop flange 328 will be positioned at its bottom most position within its slot 282. If drawer position control bar motor 290 moved drawer position control bar 310 to its upper most position, stop flange 328 would not engage or act as a stop for any of the control tabs 236-246 and the drawer could be removed from cabinet 102. For example, when the all drawer switch 664 is actuated by a technician drawer position control bar 310 will be moved to its uppermost position and each of the solenoids will be sequentially actuated releasing each of the drawers. In addition, a home switch 311 is located within post 182 and within opening 280 so that plate 302 can actuate it when the drawer position control bar 310 is in its uppermost position. This home switch 311 established the home position for drawer position control bar 310. It is from that point that the control system 600 will know how much to incrementally move the drawer position control bar 310, for example in a downward direction. This can be achieved, by controlling motor 290 and the rotation of threaded rod 296 by sensing rod rotation. One way to accomplish this controlled rotation of rod 296 is by moving rod 296 through a given number of rotations, or increments thereof, by generating specific control pulses to incrementally activate motor 290 and it drive of rod 296. This control over the precise, incremental, movement of threaded rod 296, and thereby the incremental movement of control bar 310, could also be accomplished by use of optical stepper controls, for example using slotted control discs associated with the rod 296 or the control bar 310 itself to sense vertical movement, discrete sensors associated with the motor 290 or rod 296 to count or sense rod rotation, or by switches that can count or recognize the incremental rotation of rod 296. When control bar 310 has incrementally moved a desired and controlled distance stop flange 328 will have been positioned at a controlled location so that it can act as a stop for that control tab locations which will permit the selected drawer to only open to the next available compartment therein containing the selected item for vending. When a selected vend requires providing a kit or associated group of items, for example, gloves, safety glasses and ear plugs, the control system can sequentially operate the relevant solenoids 370 to unlock the coupled drawers containing the items in the kit, one after the other, and for each unlocked drawer motor 290 will sequentially reposition control bar 310 to permit the coupled drawers to be opened, one after the other, until the whole kit, or the coupled items are fully vended. In this manner one vend selection is required for a group of items rather than a series of vend selections.

Consequently, as drawer position control bar 310 is moved incrementally along its vertical path, stop flange 328 will progressively engage and act as a stop for successive control tabs thereby controlling accessibility to the various compartments within any given drawer. This same approach will be used for each drawer and the control system 600 will continuously monitor vends so that as vending cycles proceed vending from properly selected compartments still containing items will be made accessible.

Following a vend, the individual can then push the drawer closed with control tab 236 moving lever 354 up, and passing beneath lever 354, and as spring 252 is compressed control tab 236 will be engaged by tooth 358 and the drawer will thereby be returned to its closed and locked condition.

While FIG. 8 shows two adjacent drawer lock and release assemblies 340, additional pairs of these lock and release assemblies 340 are provided at spaced apart intervals up and down support 182 to control the opening of the actual configuration of drawers within the equipment. For example, FIG. 7 shows ten draw lock and release assembly 340 spaced apart along the rear of the front support post 182, with each operative with one pair of slide supports 184 or 188. It should be understood that this is exemplary only as other numbers thereof and other configurations are contemplated as well depending upon the size and number of drawers being used.

Also included adjacent each set of drawer slide supports, one opposing set for each drawer, are limit switches 370 which are located, as shown in FIG. 7, adjacent the rear end of each slide support and forward of rear support post 184. Limit switches 370 will provide data inputs to the control system 600 indicating a drawer is in a closed and locked condition. It should be understood that limit switch 370 could be positioned elsewhere in the cabinet and could also comprise another type switch, so long as data about the drawer and its position is obtained.

Figure 10:
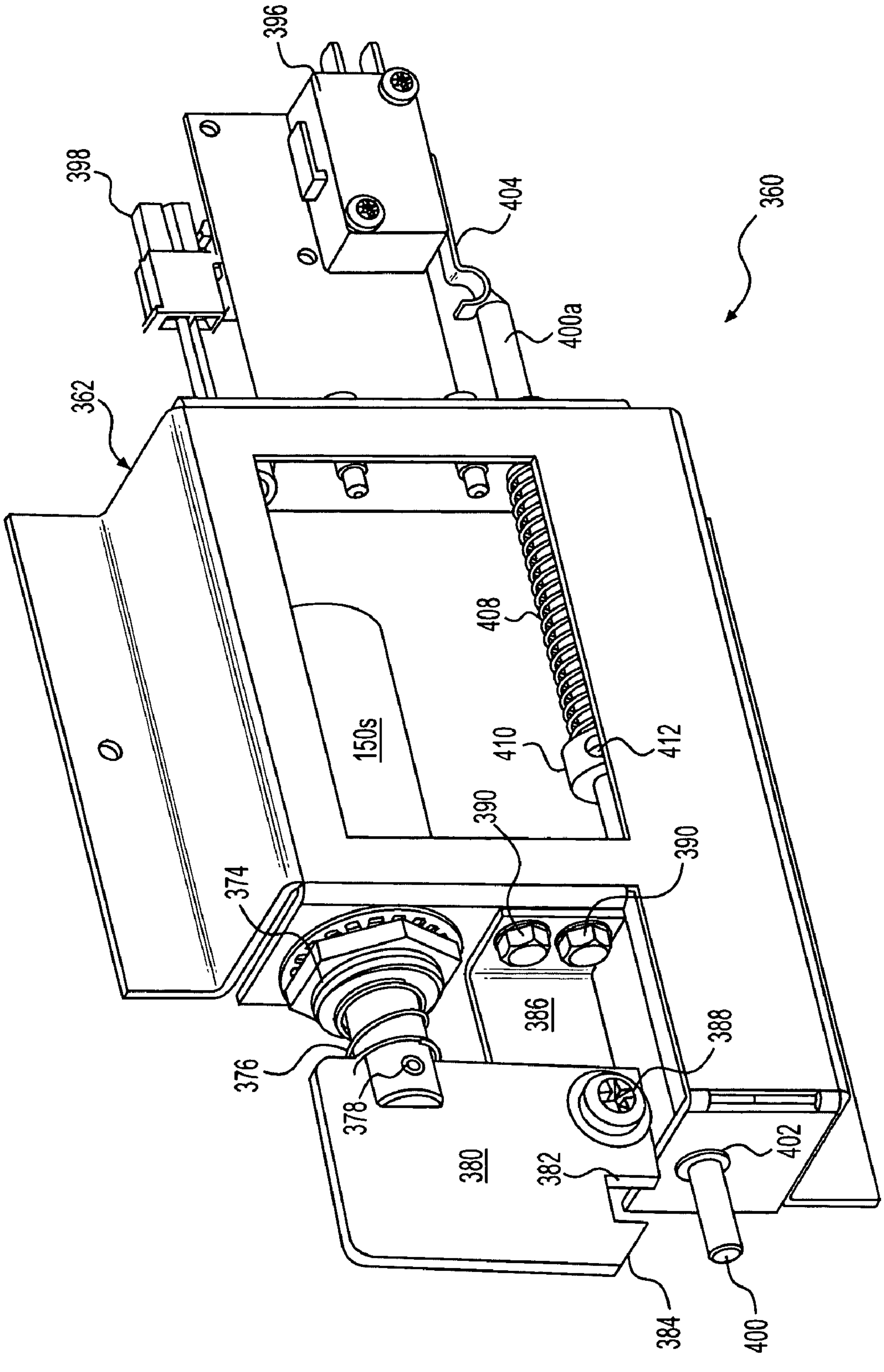
FIG. 10 is a side perspective of a locking assembly for vending doors.

FIG. 10 shows a latch and lock assembly 360 for use with the doors 150 and 170 behind which are compartments 151 and 171 respectively. The latch and lock assembly 360 includes a main frame 362 that can be mounted to an interior side wall 364 and 366 shown in FIG. 2 inside each doored compartment. Frame 362 supports a solenoid 370 that includes an operating arm 372 which extends through a bushing 374 mounted onto the frame 362. A compression spring 376 extends around arm 372 and a latch 380 is connected to arm 372 by a pin 378. Latch 380 includes a notch 382 rearwardly of a sloped or angled surface 384 and latch 380 is also pivotally mounted to a flange 386 by a screw 388. Notch 382 will snap fit over a complementary flange (not shown) attached to the interior of each door 150 and 170, which will slide along angled surface 384 to raise latch 380 as the door is closed and the notch 382 engages the door flange. Flange 386 is itself attached to frame 362 by screws 390. A rearwardly extending flange 394 supports a limit switch 396 and a power and control plug connection is shown at 398 for solenoid 150*s*. A sensor and tensioning rod 400 slides within a bearing 402 provided within a front end of the frame 362 and rod 400 continues through frame 362 and extends outwardly beyond a rear portion of frame 362 with a rear portion 400*a* of the rod operating a switch lever 404 of limit switch 396. Rod 400 is urged in a forward direction by a spring 408 with the amount compression under which spring 408 is set being controlled by a movable shaft collar 410 that is held on rod 400 by a set screw 412 so that its position on rod 400 and the compression level for spring 408 are both adjustable. Another shaft collar (not shown) can be used on rod 400 outside of frame 362 and on the rear portion 400*a* to control the extent of forward motion to be permitted for rod 400 due to the force of spring 408. Other rod movement and spring control techniques could be used as well.

FIGS. 11 and 12 show further details of the return section 108 that is located on the right side of wall unit 200 and includes an interior and enclosed return space and an elevator assembly 440. At the top of the return section 108 is a vertically and horizontally extending interior side wall 420 mounted between front support 202 and rear support 204 by screws or another form of connector. Interior side wall 420 has a top edge 421 and a bottom edge 423. A horizontally extending top plate 422 is mounted to interior wall 420 by screws or another form of connector and an upstanding flange 424 is fixed to top plate 422, again by screws or another connector, at a point about two thirds of the length back from the front edge of top plate 422, although the specific location of flange 424 is not critical. Flange 424 supports a light device 426 that will, when activated, light the interior space within the return section 108. The light device 426 need only be positioned on plate 422 so that the interior of the return space is sufficiently illuminated so that one can see into the space and the returned items. A bottom horizontal plate 428 is also attached to interior wall 420, again by screws, rivets or another convenient connection approach, and a light beam device 430 that can send out a beam of light, is positioned beneath bottom plate 428. It can be noted that plates 422 and 428 are positioned adjacent the top and bottom of return opening 483 in the return space front door 480 as shown in FIGS. 1 and 2.

A light beam generating device 430 is shown in FIG. 11 as extending out from the front of bottom plate 428, but when installed the connection wiring 431 will be bent back so that the light beam device 430 will be attached to the bottom of plate 428 and its resulting light beam will be directed rearwardly toward the back of the return space 108. In use, light beam device 430 will direct a beam of light rearwardly toward a reflector or light beam detector 434, located on support 204 at the rear of the return space. When a light beam from light beam source 430 is on it will be directed initially toward reflector 434 which will then reflect the light beam back toward the front of the return space where the light beam will be intercepted by a receiver 436 mounted beneath plate 428 on front support 202. As long as a beam of light is seen by receiver 436 that will indicate that a pile of returned items on elevator shelf 442 is not too high. However, when the light beam is broken loss of the light signal at receiver 436 will cause elevator assembly 440 to be moved downwardly. This downward movement can be by preset intervals or only until the light beam is reestablished at receiver 436.

A rear chute plate 438 is attached at an angle to interior side wall 420 adjacent the rear thereof and at a level that permits plate 438 to span above and below the level of bottom horizontal plate 428. That chute plate 438 helps assure that returned items will be directed toward elevator shelf 442.

Elevator assembly 440 is positioned beneath the opening between bottom plate 428 and chute plate 438 and includes a top shelf 442, to which an angled side plate 441 is fastened. Side plate 441 has two rearwardly extending portions 443 and 445 that are spaced apart to fit around threaded drive member 460. Plate 441 will be connected to the top shelf 442 to fit under and outside of the bottom edge 423 of interior wall 420 to thereby direct returned items onto the elevator and to prevent items from falling into the open space around drive member 460 and the return space side of wall 206 between supports 202 and 204. Elevator shelf 442 can also be provided with other angled walls 447 that extend around the remaining front opposite side and rear edges thereof to hold returned items and to keep items from falling off the front, rear and right sides of elevator shelf 442. Elevator assembly 440 also includes a bottom support structure 444 that works with and interfits within a set of opposing vertically oriented guides 446 and 448, respectively positioned on the internally facing walls of front and rear supports 202 and 204. The support structure 444 includes a pair of braces 450 and 452 and a cross bar 454. Each brace 450 and 452 includes a slide mechanism (not shown) that will interfit with in guides 446 and 448 to control the motion of elevator 440 as it is moved in both up and down directions. Elevator assembly 440 in one representative design also includes threaded drive member 460, rotatably mounted in a bottom mount 461 positioned on a bottom cross beam 205 and to a drive motor assembly 462 that will rotate drive member 460 in both clockwise and counter clockwise directions to thereby raise and lower elevator shelf 442, respectively. An upper limit switch 470 and a bottom limit switch 472 provide data to the control system 600 indicating when elevator shelf 442 is in its uppermost and lowermost positions, respectively. Bottom limit switch 472 can also be used to power a light, an alarm or other form of signal to alert technician when the return bin is full.

Thus, as items are returned into the return space they will accumulate on shelf 442 and if thrown or tossed into the return space they will be directed by plate 438 onto shelf 442. As the accumulated items increase in volume and a stack up on top shelf 442 interruption of the light beam from light device 430 to receive 436 will cause motor 462 to be actuated to lower shelf 442.

The return section 108 also includes a front door 480, operatively mounted to cabinet 102 by a vertical hinge 481 and includes an opening 483 through which items can be inserted in the return space. Door 480 will be kept closed by a door latch 482 mounted to the front support 202 as shown in FIG. 11. When the shelf 442 is lowered to its bottom most position, or at least to some lower position and returned items are to be collected, the front door 480 can be opened upon the release of latch 482 and the accumulation of returned items can be removed. Prior to closing door 482 a momentary (for safety) push button switch 483, adjacent latch 482, can be manually pushed and that will initiate elevator drive motor assembly 462 to actuated to return shelf 442 back to its uppermost position to begin the return process once again. If inventory return was not desired, the return space, with elevator assembly 440 at a desired position or perhaps even removed, could also be used for storage of excess inventory, and the upper opening could be used for marketing or other display purposes.

In addition to the above functions and uses of the return section 108, that area can also accept a wide variety of items, for example it can be used to collect batteries and ink cartridges for recycling purposes. This can also be used to recycle re-useable packaging (like foam sleeves). The printer 658 could programmed to generate a return label to attach to returned items thereby establishing a credit to an individual, a team or a department. Printer 658 can also be used by the control system 600 to generate reports, a trouble log, a listing of returned items, corresponding to the return labels that have been printed and provide assistance to an operator concerning returned items. If items that have been vended are provided with a bar coded label, identifying a particular item, a user could scan the bar code by reader 652 and then place the item into the return section 108 again gaining a credit for the return. It can also be a collection point for items that do not need immediate reuse (like drills to be sharpened). While return section 108 is a desirable part of the vending equipment, it is not an integral part of the equipment, but rather it is an accessory that could be excluded, either for cost savings or that space could be filled with another column of narrow drawers.

With respect to the width of drawers, there is no set or required drawer width for drawers or lockers, nor is there any particular configuration of how many vertical stacks of drawers or lockers one could employ. Rather, the while the width of any particular vertical stack of drawers will need to be of the same width, a variety of different width drawer stacks could be used in one vendor device, the vending equipment may contain only one very wide vertical stack of drawers, each of a plurality of vertical stack of drawers or lockers could be of the same width and there could be several vertical stacks in one piece of equipment. The lockers, for example at the top of the cabinet, could be of the same width as the drawers there below, or a locker could span across several vertical stacks of drawers or the vending equipment could contain a variety of lockers of varying sizes and widths.

Figure 13:
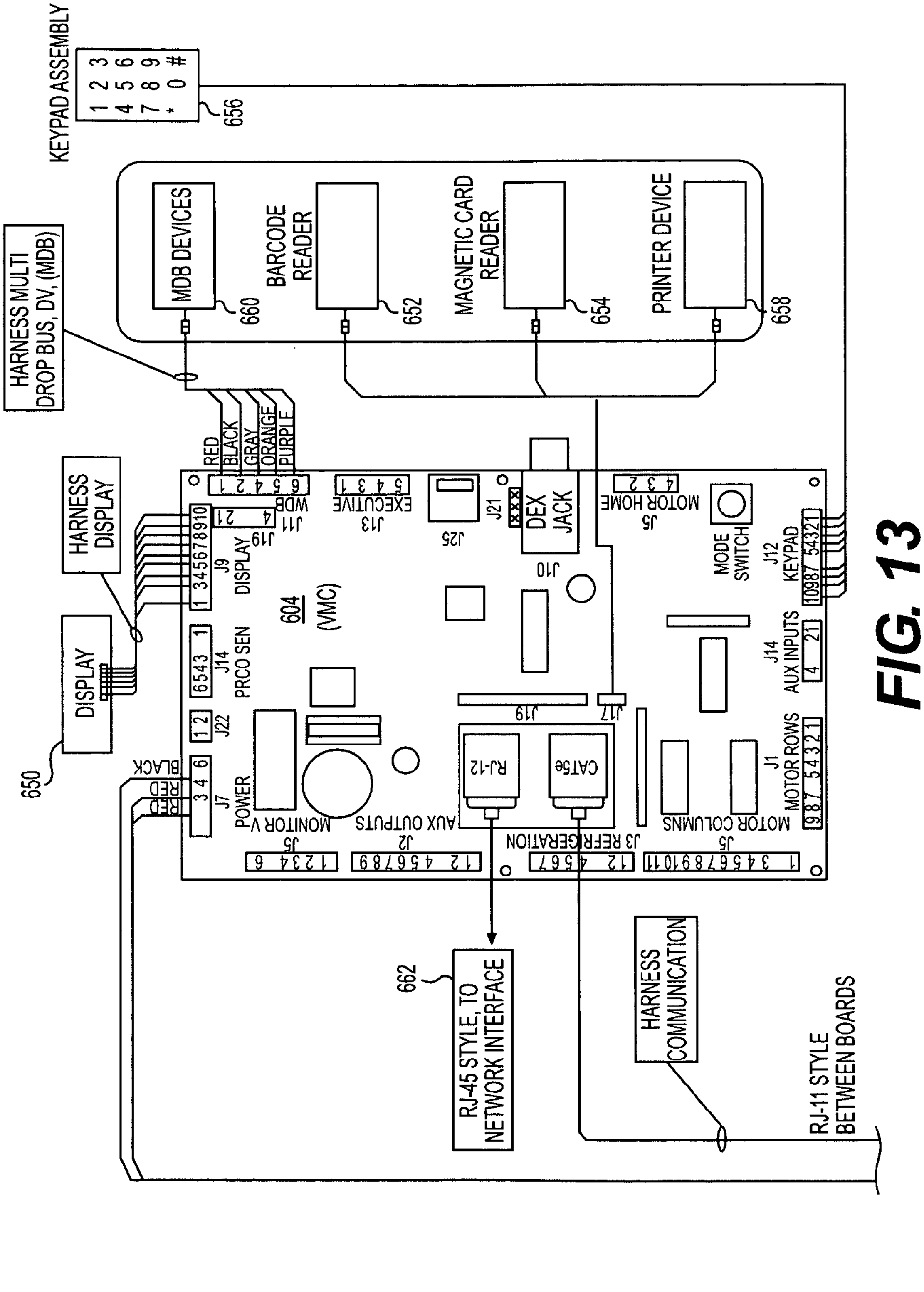
FIGS. 13 and 14 show the wiring diagram for the vending equipment disclosed herein.
Figure 13:
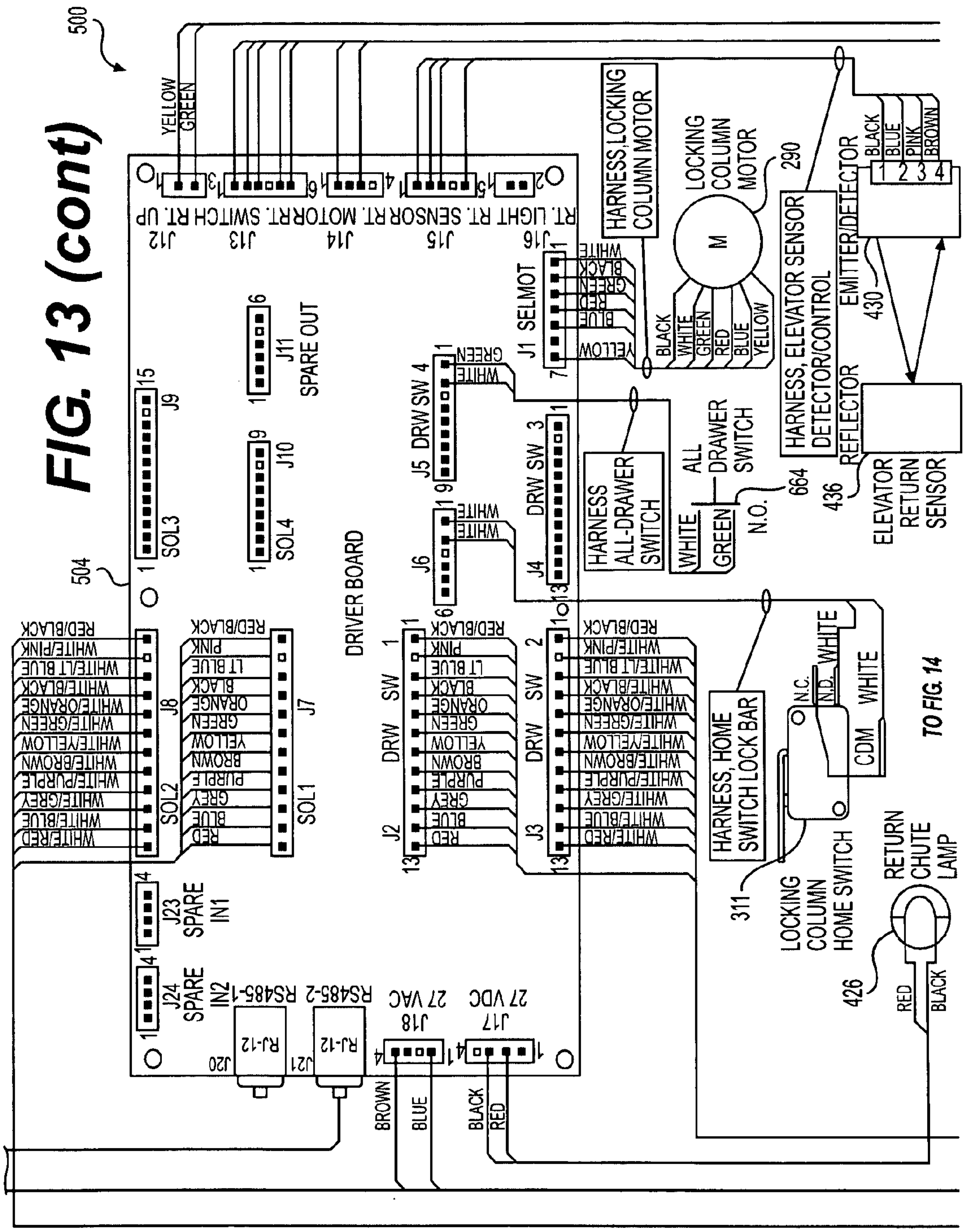

FIGS. 13 and 14, which interconnect as indicated, set forth the wiring diagram 500 of the drawer vender 100. Included is a power supply section 502, a micro controller or VMC 604 in the middle of FIG. 13, a driver board 504 there below, a solenoid array 506, an array of drawer limit switches 508, a display 650, a bar code reader 652, a magnetic card reader 654, RFID receiver, Biometric reader, or other input device, a keyboard 656 and a printer device 658. Also shown are the elevator limit switches 470 and 472, motors 290 and 462, and an RJ-45 network interface connection 662. Because this drawer vending apparatus can also be used in situations where vended items are being sold, as opposed to, for example, a factory setting where parts and supplies are being vended rather than having a supply store operated by an individual, it is contemplated that coin change and bill validators can be connected into the control system. The connection point for such equipment is shown at 660 for MDB devices in the upper portion of FIG. 13. On the VMC board 604 is the RJ-45 network interface connector 662 through which a PC or internet connection could be established or another device could be connected. This connection will permit the PC to update inventory date, to check on current inventory, activity and what has been vended, to change or otherwise alter control system configuration, to reconfigure the control system after restocking, and other maintenance or monitoring tasks. Also connected to interface board 505 is an "all drawer" switch 664. Switch 664 will be located internally within cabinet, adjacent the circuitry or the PC, for example a blade type PC, and will permit a technician to easily release all drawers by causing the drawer position control bar 310 to move to its upper most position, where each control tab will not be stopped and it will also sequentially activate each solenoid to release all drawers and doors from their locked condition.

It can be noted in FIG. 14 that the solenoid array 506 includes two sets of solenoids, one for each set of stacked drawers 130 and 132. Thus, the left set for drawer stack 130 includes solenoids 134S-148S. Since drawer 138 has a front face that is equal to three times the base height for drawer front faces, two additional solenoids 139S and 14S are not used and the control system 600 will be programmed to consider them inactive since solenoid 138S will provide control over that drawer. The right set, for drawer stack 132 includes solenoids 152S-168S. Here again, since drawer 152 has a double high front face the next above solenoid 151S will be unused in this drawer configuration. Should the double high front face for drawer 152 be changed to a base height front face, then another base height drawer 151 can be added between drawers 152 and 154 and then solenoid 151S, that had previously been programmed to be inactive, will be reconfigured and activated so that control system will again use that solenoid to control that drawer after being reset by PC. Alternatively, this reconfiguration of the control system 600 might be automatically programmed by the sending of the closing of its respective limit switch 370 when it is first closed after the change in drawer configuration heights. In a similar fashion, two of the stop tab assemblies 320 within drawer stack 130, associated with the vacant drawer slots 139S and 141S, will not have any control tabs with which they can operate and will be inoperative. However, should drawer size changes be made they may be useful with drawers used in those slots. The same applies to drawer slot 151 within drawer stack 132.

Figure 15:
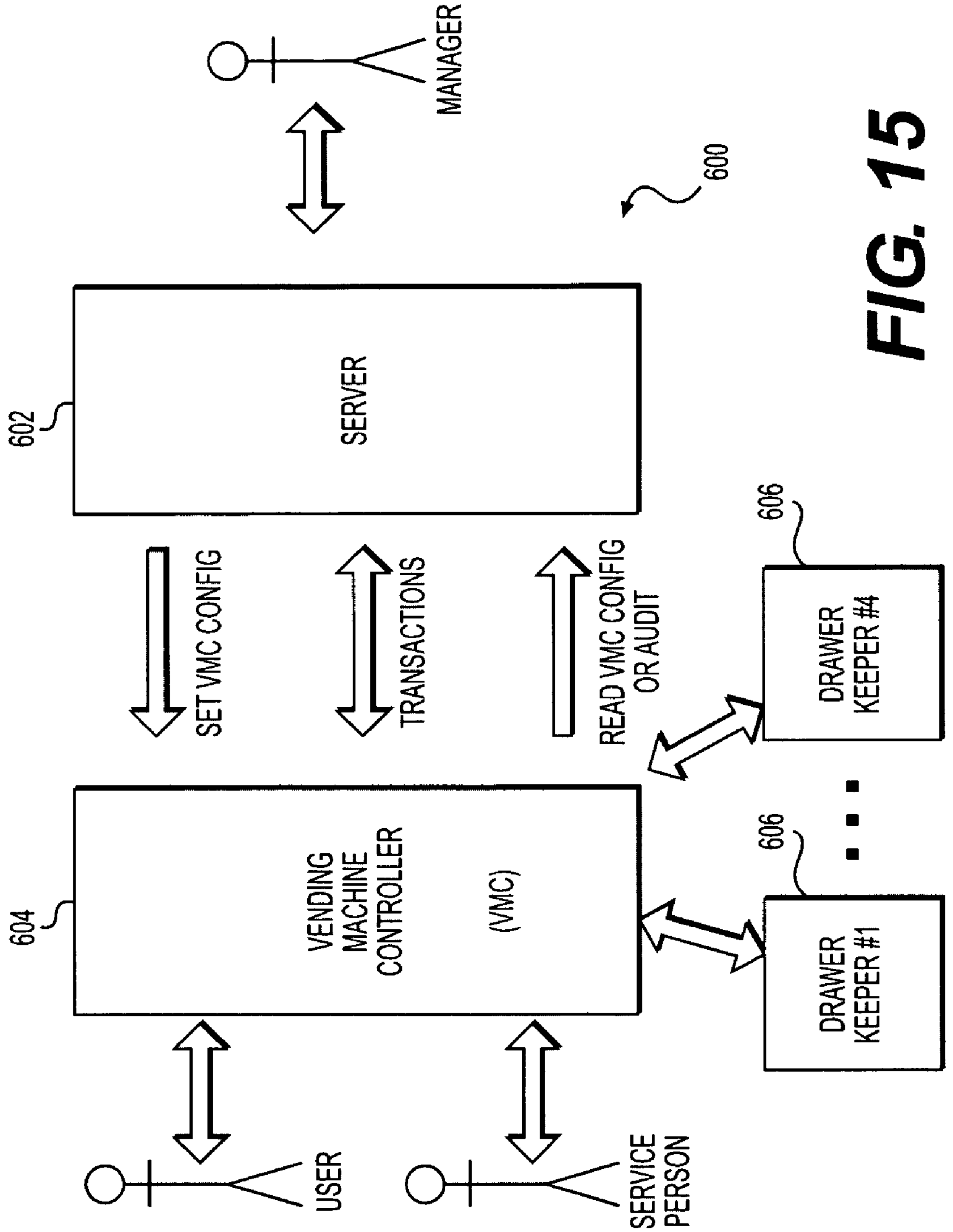
FIG. 15 is a diagrammatic view of the control system.

FIG. 15 shows an overall diagrammatic view of the control system 600 as including a server or computer 602, which can be a PC, a vending machine controller or VMC 604, for example a CPU or microcontroller such as a model PIC24HJ256GP206-I/PT, and a drawer unit 606 or a plurality of such interconnected or wireless drawer units.

Figure 16:
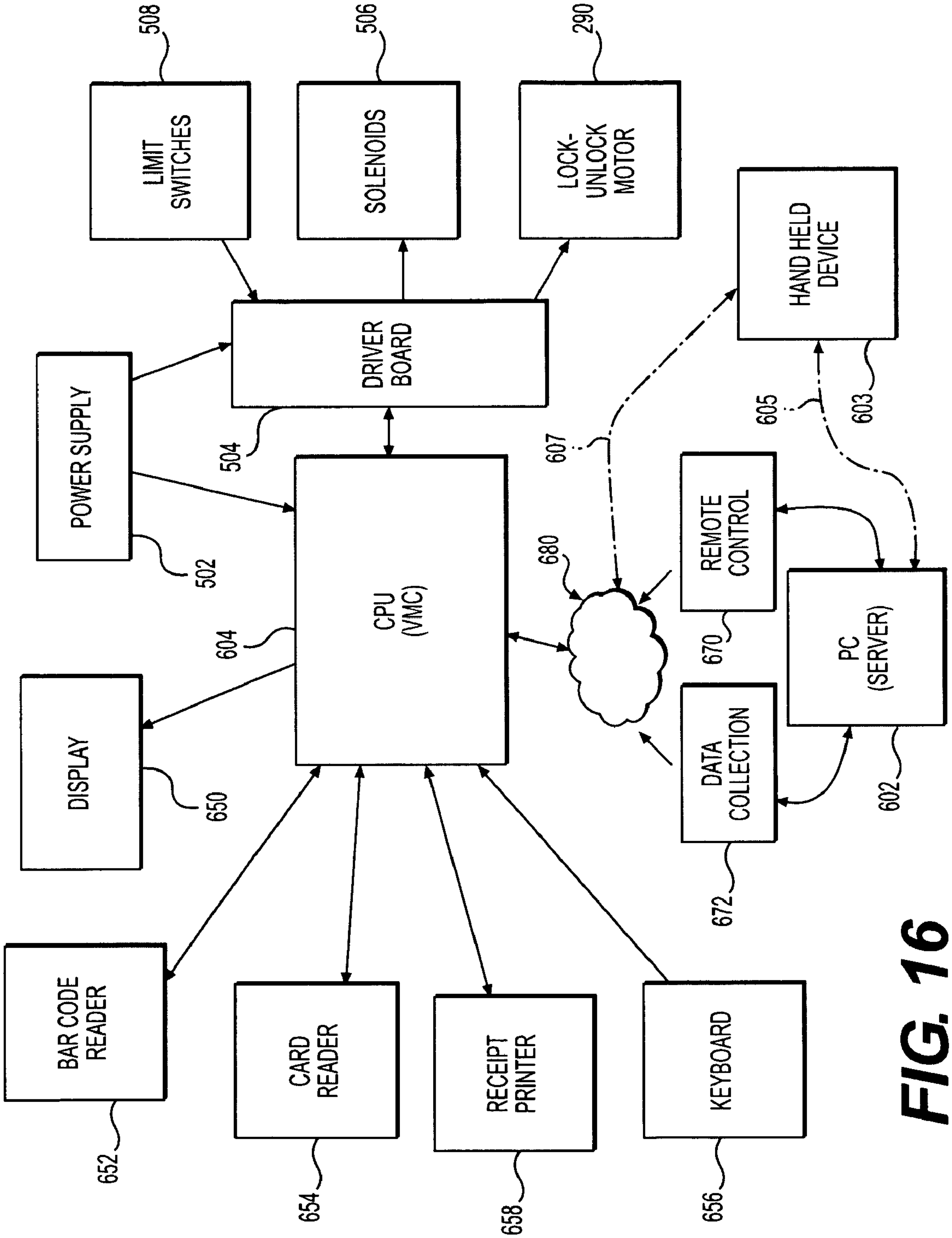
FIG. 16 shows the components of the control system.

FIG. 16 shows a representative arrangement of the various control devices used and their interconnections for one embodiment of a drawer vending device that will be controlled by the control system 600. The control server or computer 602 and VMC 604 will interact on a real time basis and can exchange messages over a TCP/IP logical network, a private network, the internet, or by any other convenient interconnection technology. For that matter the computer can be a blade PC included within cabinet 102. The connection between the VMC 604 and the server or computer 602 could also be, for example, via an Ethernet interface device, as manufactured by Lantronix using a standard RJ-45 connection 601 or other asynchronous serial to Ethernet conversion device. This interface device would allow connections with 10 BASE=T and 100 BASE-TX physical networks. Both the VMC 604 and server 602 will be suitably configured with the IP address and port number of the server, for inbound connections, for outbound connections, and desirable passwords or security codes and so on. These and any other convenient connection between the VMC 604 and the server 602, including for example, a hard wired connection, are represented by the cloud 680 in FIG. 16.

FIG. 16 shows the VMC 604 at the center of the control devices and receives power from the power supply 502 and controls user interface functions, maintains product inventory counts and will be re-configured as the drawer vending device is re-stocked with new items and will control other drawer vending operations including specific control over vend selection and the locking and unlocking and subsequent opening of drawers and specific compartments therein corresponding to approved vend selections, and drawer status (opened/closed). Data inputs from the bar code reader 652, from the magnetic card reader 654, and a receipt printer 658 are each provided directly to the VMC 604. Keyboard 656 is also connected directly to the VMC 604. The VMC 604 will receive, via a driver board 504, inputs from the array of limit switches 508, provide commands to, again via driver board 504, the array of solenoids 506 and to the drawer position control bar motor 290. The server can also have remote control access and control over the VMC 604 via an interface 670 as well as data collection or machine control configuration data, including inventory data, via an interface 672. Further, it is also contemplated that data collection, inventory control, configuration or other control functions could be supplied or provided via a hand held device 603 and that access to the VMC 604 could be, for example, via the server 602, through a connection shown at 605 that could be wired or wireless, or directly to the VMC 604 via a wireless, hard wired or plug in type of connection depicted at 607.

Figure 17:
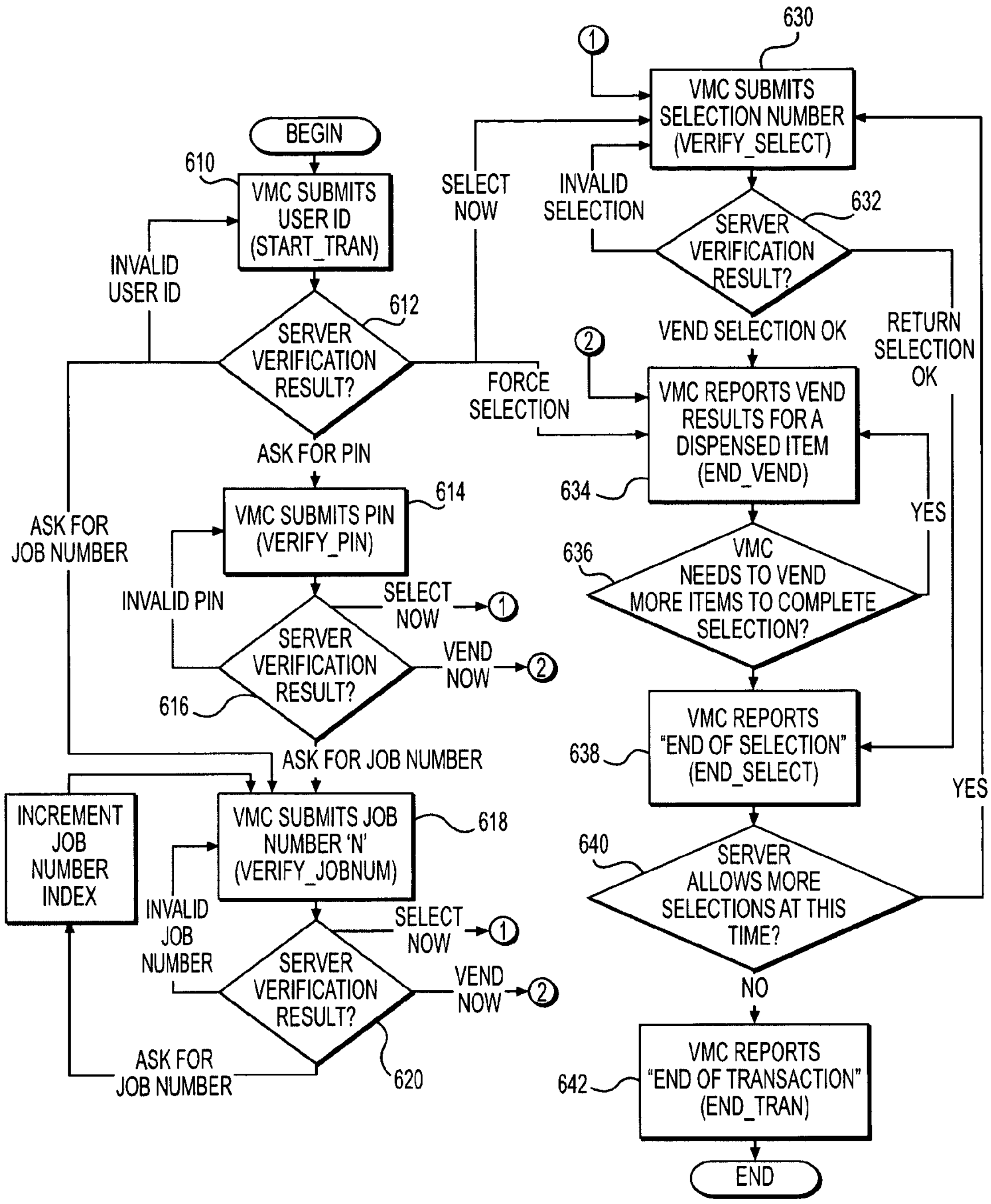
FIG. 17 is a flow chart showing the vending process.

FIG. 17 sets forth an exemplary flow diagram of one embodiment of a vending process that will be controlled by the control system 600. The start of an exemplary vend transaction, with reference to FIG. 16, begins with a user entering his or her used ID as at 610 which can be entered into the system, for example, by a bar code reader 652, by a card reader 654, by a keyboard input from keyboard 656, or from any suitable data input source. Once a user has input his or her ID that would be checked as in step 612 against a previously stored listing of approved user IDs. If a pin number were also required it could be requested and input at 614 and here again there will need to be a verification of such a pin number at step 616 against a stored list of approved pin numbers, to confirm that a pin number being used was correct and/or authorized. If no pin number is required it is possible to proceed to the vend selection step at 630, also shown in FIG. 16 on the right side. Assuming a pin number has been used and verified, then the user can then again proceed directly to the vend selection step at 630.

If a job number is also required it can be entered at step 618, for example, via keyboard 650. Once again, the job number can be verified in step 620 and then the user can proceed to the vend selection step 630.

When the user has a proper and verified ID, has inserted a verifiable pin number, if required, and a verifiable job number, also if required, then the user can begin an item selection sequence which begins with step 630 as mentioned above. The user can enter data corresponding to a particular item or drawer, for example, with the objective of gaining access to the next occupied compartment containing the selected item. Selection data can be entered via keyboard 656, for example, and that selection is then checked and if verified in step 632. If the selection is correct and verified, vend selection will actuated in step 634 by the VMC 604. If the selection is not verified in step 632, due to its being either an invalid entry, because the item requested is out of stock, or a possibly out of a possible range, or that this particular user or job will not be permitted to obtain the selected item. As a consequence of such an invalid selection the user will be directed back to the vend select input in step 630 where another item selection can be made and the verification step 632 will again be entered. It is also possible to couple multiple drawers together for an opening sequence to provide, for example, three related parts or supply items or items that may be conveniently grouped together for vending purposes. In instances where multiple items are properly selected, VMC 604 will open the three selected and coupled drawers, corresponding to the group of selected items to the next occupied compartment in each the set of three drawers.

Once a vend selection has been verified in step 632 and the VMC has opened the selected drawer to the correct compartment therein, step 634 will report to the VMC that a vend has occurred. If only one item was requested then the control system will generate a "vend end" signal in step 634 that will then end the vending process. Step 636 will be bypassed and in step 638 the VMC will report that the end of the selection process has been reached successfully and in step 642 the VMC will generate and "end of transaction" signal to end the selection process.

If more than one item had been selected, for example a kit containing several items or components in different drawers, step 634 can generate a signal indicating that while a part of the items in the selected kit have been completed, there are remaining items to be vended and step 636 will continue to permit new vends until all of the remaining items in the selected kit have been successfully vended. If the user would thereafter like another round of item selection step 640 will return the user to step 630 for another selection.

Once the selection process has been competed, as discussed above, the VMC will end the process and the user can push an opened drawer closed the tripping of limit switch 370 for that drawer will trigger the drawer position control system to again lock that drawer and allow the next vend if desired. It is also possible to give the user a second chance for a vend if a mistake has occurred. For example, the user could push a key on the keypad 656, for example the asterisk key, so that the previously-opened drawer will re-open to the same selected compartment as was originally authorized. Such a command is helpful especially where a drawer was either inadvertently or mistakenly pushed shut and locked while trying to open it and in this situation the user should be permitted another chance to complete the desired vend thereby assuring a guaranteed delivery of the selected item.

When the vending equipment is initially filled with items to vend and each time drawers are re-stocked with new items, data corresponding to the items being added and to their location within the plurality of drawers and their respective compartments will be input to the VMC. This will reestablish the known inventory of item to be vended. Thereafter, a count-down system will be employed by the VMC to identify where the next of any particular item that has been properly selected by a user is located and the VMC will then open the proper drawer to the next compartment containing the selected item.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A multiple drawer vending device comprising a cabinet;

a plurality of drawers, each drawer having at least one compartment and being slidably mounted within the cabinet so that each is incrementally movable and controlled between fully closed and fully open positions;

a controller having data corresponding to the contents in each of the at least one compartment in the plurality of drawers and by which access to a particular one of the plurality of drawers and to the at least one compartment therein is controlled by authorization and selection inputs;

each of said plurality of drawers having at least one position control member mounted thereto, each position control member having at least one stop structure thereon comprising a series of progressively positioned control tabs that are spaced apart both horizontally and vertically; and a drawer opening and position control system working in conjunction with the position control member, with the actuation of the drawer opening and position control system being controlled by the controller to regulate access to a selected drawer and compartment therein.

2. The multiple drawer vending device as in claim 1 wherein the authorization inputs include data generated from at least one of the following:

a data reader, or a keyboard.

3. The multiple drawer vending device as in claim 1 wherein the data reader includes a magnetic card reader and a bar code reader.

4. The multiple drawer vending device as in claim 1 wherein the at least one stop structure comprises at least one control tab.

5. The multiple drawer vending device as in claim 1 wherein the series of progressively positioned control tabs are formed on an attachment secured to the plurality of drawers .

6. The multiple drawer vending device as in claim 1 wherein the progressively positioned control tabs are mounted at spaced apart positions along a linear path.

7. The multiple drawer vending device as in claim 6 wherein the linear path is positioned at an angle relation to a top edge of a drawer.

8. The multiple drawer vending device as in claim 1 wherein each drawer of said plurality of drawers includes a slide mount assembly and said cabinet includes a plurality of opposing sets of complementary slide receiving assemblies each opposing set being capable of slidably retaining one of said plurality of drawers.

9. The multiple drawer vending device as in claim 8 wherein more than one of the plurality of drawers comprises a standard front height drawer structure.

10. The multiple drawer vending device as in claim 9 further including at least one drawer having a front structure that is a multiple of the standard front height drawer structure.

11. The multiple drawer vending device as in claim 1 wherein the plurality of drawers includes single, double and triple height front drawer structures.

12. The multiple drawer vending device as in claim 8 wherein the plurality of drawers includes drawers that have a common front height structure as well as drawer front structures that are multiples thereof.

13. The multiple drawer vending device as in claim 1 wherein each of the plurality of drawers have a plurality of removable interior compartments, the number and size of the interior compartments corresponding to the position of the series of progressively positioned control tabs.

14. The multiple drawer vending device as in claim 1 further including a collection bin provided within the cabinet and extending vertically within the cabinet adjacent to and along an exterior side wall thereof.

15. The multiple drawer vending device as in claim 14 wherein the collection bin further includes an adjustable bottom wall.

16. The multiple drawer vending device as in claim 15 wherein the adjustable bottom wall comprises an automatically repositioned bottom wall that moves downwardly as items are collected.

17. The multiple drawer vending device as in claim 15 wherein the adjustable bottom wall comprises an movable elevator assembly the movement there of being actuated in response to sensor input triggered by a collected item.

18. The multiple drawer vending device as in claim 14 wherein the collection bin further includes a door providing control over the access to an interior of the collection bin.

19. The multiple drawer vending device as in claim 1 wherein the opening and position control system includes a controlled lock mechanism for each of the plurality of drawers.

20. The multiple drawer vending device as in claim 19 wherein the lock mechanism comprises a lock bar that will interact with the at least one stop structure.

21. The multiple drawer vending device as in claim 20 further including a solenoid actuator operatively connected to the lock bar.

22. The multiple drawer vending device as in claim 19 further including a drawer stop system to control the opening of drawers and to limit access to an authorized portion therein.

23. The multiple drawer vending device as in claim 22 wherein the drawer stop system is positioned on a central post and positioned to intercept the at least one stop structure.

24. The multiple drawer vending device as in claim 23 wherein the at least one stop structure comprises a series of progressively positioned control tabs positioned at spaced apart vertical and horizontal locations and the drawer stop system is controlled to incrementally intercept successive ones of the series of control tabs.

25. The multiple drawer vending device as in claim 8 further including at least one spring positioned at the rear of each drawer to propel a drawer to an initial open position.

26. The multiple drawer vending device as in claim 1 further including a plurality of doored compartments under the control of the control system.

27. The multiple drawer vending device as in claim 26 wherein each door is opened by a spring to an initial open position when a locking latch is released by the control system.

28. The multiple drawer vending device as in claim 1 wherein the control system further includes a plurality of sensors to monitor drawer status.

29. The multiple drawer vending device as in claim 27 wherein the control system further includes a sensors to monitor the status of each door.

30. The multiple drawer vending device as in claim 1 wherein the control system controls a plurality of multiple drawer vending units.

31. The multiple drawer vending device as in claim 1 further including a refrigeration unit to chill the interior of the vending device to protect temperature sensitive items being vended.

32. The multiple drawer vending device as in claim 1 wherein the control system further includes a receipt printer.

33. The multiple drawer vending device as in claim 1 further including a receipt printer for printing selected items as determined by the control system.

34. A multiple space vending device comprising a cabinet;

a plurality of drawers, each drawer having a plurality of compartments and being slidably mounted within the cabinet so that each drawer is incrementally movable and controlled between fully closed and fully open positions;

at least one doored compartment having a closed and locked door, a controller having data corresponding to the contents in each of the compartments in the vending device and by which access to a particular one of the compartments therein is controlled by authorization and selection inputs;

each of said plurality of drawers having a position control member mounted thereto, each position control member having a series of stop structures thereon with each being spaced apart horizontally and vertically;

each doored compartment having a door lock mechanism; and a compartment opening and position control system working in conjunction with the position control member and door lock mechanisms, with the actuation of the compartment opening and position control system being controlled by the controller to regulate access to a selected compartment in the vending device.

35. A multiple drawer vending device comprising a cabinet;

a plurality of drawers, each drawer having at least one compartment and being slidably mounted within the cabinet so that each is incrementally movable and controlled between fully closed and fully open positions;

a controller having data corresponding to the contents in each of the at least one compartment in the plurality of drawers and by which access to a particular one of the plurality of drawers and to the at least one compartment therein is controlled by authorization and selection inputs;

each of said plurality of drawers having at least one position control member mounted thereto, each position control member having at least one stop structure thereon; and a drawer opening and position control system working in conjunction with the position control member, with the actuation of the drawer opening and position control system being controlled by the controller to regulate access to a selected drawer and compartment therein, the opening and position control system including a controlled lock mechanism for each of the plurality of drawers;

a drawer stop system to control the opening of drawers and to limit access to an authorized portion therein, the drawer stop system being positioned on a central post and positioned to intercept the at least one stop structure; and wherein the at least one stop structure comprises a series of progressively positioned control tabs positioned at spaced apart vertical and horizontal locations and the drawer stop system is controlled to incrementally intercept successive ones of the series of control tabs.

36. A multiple drawer vending device comprising:

a cabinet;

a plurality of drawers, each drawer having at least one compartment and being slidably mounted within the cabinet so that each is incrementally movable and controlled between fully closed and fully open positions;

a controller having data corresponding to the contents in each of the at least one compartment in the plurality of drawers and by which access to a particular one of the plurality of drawers and to the at least one compartment therein is controlled by authorization and selection inputs;

each of said plurality of drawers having at least one position control member mounted thereto, each position control member having at least one stop structure thereon comprising a series of progressively positioned control tabs that are spaced apart both horizontally and vertically, and are mounted at spaced apart positions along a linear path positioned at an angle relative to a top edge of a drawer; and a drawer opening and position control system working in conjunction with the position control member, with the actuation of the drawer opening and position control system being controlled by the controller to regulate access to a selected drawer and compartment therein.

* * * * *